US012771650B2

(12) United States Patent
Lal et al.

(10) Patent No.: US 12,771,650 B2
(45) Date of Patent: Oct. 20, 2026

(54) CUSTOMER-CENTRIC, APPLICATION-FLOW AWARE BROADBAND SERVICE

(71) Applicant: Adeia Guides Inc., San Jose, CA (US)

(72) Inventors: Dhananjay Lal, Englewood, CO (US); Charles Dasher, Lawrenceville, GA (US); Tao Chen, Palo Alto, CA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 302 days.

(21) Appl. No.: 18/626,668

(22) Filed: Apr. 4, 2024

(65) Prior Publication Data

US 2025/0317403 A1 Oct. 9, 2025

(51) Int. Cl.
*H04L 47/6295* (2022.01)
*H04L 47/2483* (2022.01)

(52) U.S. Cl.
CPC ...... *H04L 47/6295* (2013.01); *H04L 47/2483* (2013.01)

(58) Field of Classification Search
CPC . H04L 47/24; H04L 47/2441; H04L 47/2475; H04L 47/2483; H04L 47/6215; H04L 47/6295
See application file for complete search history.

(56) References Cited

U.S. PATENT DOCUMENTS

| | | | | |
|---|---|---|---|---|
| 10,448,268 | B1 * | 10/2019 | Jaya | H04W 24/04 |
| 10,686,716 | B2 * | 6/2020 | Holla | H04L 47/6295 |
| 11,069,082 | B1 | 7/2021 | Ebrahimi et al. | |
| 11,831,553 | B2 * | 11/2023 | Dutta | H04L 45/34 |
| 11,863,465 | B1 | 1/2024 | Nijim et al. | |
| 12,261,711 | B2 | 3/2025 | Phillips et al. | |

(Continued)

FOREIGN PATENT DOCUMENTS

| | | | | |
|---|---|---|---|---|
| EP | 4120656 A1 * | 1/2023 | | H04L 47/6295 |
| WO | 2024/013545 A1 | 1/2024 | | |

OTHER PUBLICATIONS

Briscoe et al., RFC 9330: Low Latency, Low Loss, and Scalable Throughput (L4S) Internet Service: Architecture, Jan. 2023, Internet Engineering Task Force (IETF) (Year: 2023).*

(Continued)

*Primary Examiner* — Eric Nowlin
(74) *Attorney, Agent, or Firm* — HG LAW LLP

(57) ABSTRACT

Systems and methods provide a LAN connected to a WAN, where each of a first queue for preferential network traffic and a second queue for non-preferential network traffic is provided at least in part by a second networking equipment associated with the WAN. The system may receive, via a user interface, input identifying a particular category of network traffic, wherein the received input causes network (Continued)

traffic corresponding to the particular category to be processed (e.g., delivered) using the first queue instead of the second queue. The system may, based at least in part on detecting, at the first networking equipment, that a portion of subsequent network traffic associated with a request by a device of the plurality of devices connected to the LAN corresponds to the particular category, transmit instructions to the second networking equipment to process the portion of subsequent network traffic using the first queue instead of the second queue.

19 Claims, 18 Drawing Sheets

(56) References Cited

U.S. PATENT DOCUMENTS

| | | | | |
|---|---|---|---|---|
| 2005/0152378 | A1 | 7/2005 | Bango et al. | |
| 2007/0165668 | A1 | 7/2007 | Liu | |
| 2008/0089237 | A1 | 4/2008 | Molen et al. | |
| 2009/0080433 | A1 | 3/2009 | Wertheimer | |
| 2011/0051695 | A1 | 3/2011 | Dinan | |
| 2011/0270976 | A1 | 11/2011 | Yasuda et al. | |
| 2012/0011252 | A1 | 1/2012 | Alperovitch et al. | |
| 2013/0100803 | A1 | 4/2013 | Menchaca et al. | |
| 2015/0381514 | A1* | 12/2015 | Word | G06F 9/546<br>709/203 |
| 2017/0041942 | A1 | 2/2017 | Wallentin et al. | |
| 2017/0366467 | A1 | 12/2017 | Martin et al. | |
| 2018/0343206 | A1 | 11/2018 | White et al. | |
| 2020/0028792 | A1* | 1/2020 | Holla | H04L 47/6255 |
| 2020/0245163 | A1* | 7/2020 | Jaya | H04W 24/04 |
| 2021/0119941 | A1 | 4/2021 | Hoole et al. | |
| 2021/0311844 | A1 | 10/2021 | Daniali | |
| 2023/0014888 | A1* | 1/2023 | Dutta | H04L 47/6215 |
| 2023/0171203 | A1 | 6/2023 | Kalam et al. | |
| 2024/0056401 | A1* | 2/2024 | Nádas | H04L 47/36 |
| 2024/0113979 | A1* | 4/2024 | Sang | H04L 47/2475 |
| 2024/0313996 | A1 | 9/2024 | Virag et al. | |
| 2024/0331180 | A1 | 10/2024 | Phillips | |
| 2025/0150402 | A1* | 5/2025 | Östberg | H04L 47/12 |
| 2025/0158926 | A1* | 5/2025 | Zuniga | H04L 47/29 |
| 2025/0202827 | A1* | 6/2025 | Henry | H04L 47/2441 |
| 2025/0212201 | A1* | 6/2025 | Gupta | H04W 28/0925 |
| 2025/0242236 | A1 | 7/2025 | Phillips et al. | |
| 2025/0317393 | A1 | 10/2025 | Phillips et al. | |
| 2025/0317401 | A1 | 10/2025 | Reda et al. | |
| 2026/0005973 | A1* | 1/2026 | Haddad | H04L 47/31 |
| 2026/0012847 | A1* | 1/2026 | Rossbach | H04W 28/0278 |
| 2026/0089102 | A1* | 3/2026 | Rossbach | H04L 47/11 |
| 2026/0089103 | A1* | 3/2026 | Rossbach | H04L 47/11 |

OTHER PUBLICATIONS

De Schepper et al., RFC 9331: The Explicit Congestion Notification (ECN) Protocol for Low Latency, Low Loss, and Scalable Throughput (L4S), Jan. 2023, Internet Engineering Task Force (IETF) (Year: 2023).*

"Introduction to the Maplab Framework," Maplab (<https://maplab.asl.ethz.ch/docs/master/pages/overview_and_introduction/A_The-Maplab-Framework.html>, Last updated on Feb. 10, 2024 (2 pages).

Briscoe, B., et al., "Low Latency, Low Loss, and Scalable Throughput (L4S) Internet Service: Architecture RFC 9330", RFC—Informational, (<https://datatracker.ietf.org/doc/rfc9330/>) Jan. 2023 (36 pages).

Bujlow, T., "Independent comparison of popular DPI tools for traffic classification", Computer Networks, 76:75-89 (2015).

Ericsson, "Enabling time-critical applications over 5G with rate adaptation", Ericsson—Deutsche Telekom White Paper (<https://www.ericsson.com/49bc82/assets/local/reports-papers/white-papers/26052021-enabling-time-critical-applications-over-5g-with-rate-adaptation-whitepaper.pdf>) May 2021 (21 pages).

Huang, Y.F., et al., "Research on QoS Classification of Network Encrypted Traffic Behavior Based on Machine Learning", Electronics , 10(12):1376 Jun. 8, 2021 (24 pages).

Juniper Networks, "Understanding CoS Explicit Congestion Notification," Class of Service User Guide (Routers and EX9200 Switches) (<https://www.juniper.net/documentation/us/en/software/junos/cos/topics/concept/cos-qfx-series-explicit-congestion-notification-understanding.html>) Nov. 29, 2023 (11 pages).

Palmer, C., et al., "Which Internet Service Providers Have Data Caps?", HighspeedInternet.com (<https://www.highspeedinternet.com/resources/which-internet-service-providers-have-data-caps>) Feb. 8, 2023 (21 pages).

Paloalto Networks, "What Is SD-WAN?", Cloud Security (<https://www.paloaltonetworks.com/cyberpedia/what-is-sd-wan>), retrieved on Jul. 9, 2024 (6 pages).

Schepper, K., et al., "Dual Queue Coupled AQM: Deployable Very Low Queuing Delay for All", arXiv:2209.01078, Sep. 2, 2022 (7 pages).

Schepper, K., et al., "Prague Congestion Control", draft-briscoe-iccrg-prague-congestion-control-03, (<https://datatracker.ietf.org/doc/draft-briscoe-iccrg-prague-congestion-control/>) Oct. 14, 2023 (31 pages).

White, G., et al., "Low Latency DOCSIS: Technology Overview", Cable Labs (Registered), (<https://account.cablelabs.com/server/alfresco/0affb960-25f4-44f9-b747-74ad8555fd06>) Feb. 2019 (21 pages).

U.S. Appl. No. 18/626,659, filed Apr. 4, 2004, Christopher Phillips.

U.S. Appl. No. 19/730,037, filed Jul. 2, 2026, Christopher Phillips.

U.S. Appl. No. 18/667,655, filed May 17, 2024, Christopher Phillips.

* cited by examiner

User Customization of their Broadband Service

700

| Application Categories | Prioritize network traffic? | Prioritize for which device? | Prioritize for certain time windows? |
|---|---|---|---|
| Gaming | Yes | All Devices on LAN | After 5 PM on weekdays, all times on weekends |
| Video calls/ conferences | Yes | Only Laptops on LAN | All times |
| Audio Calls | No | null | null |
| Video Streaming | No | null | null |
| Cloud Camera Recording | Yes | ArloHb on LAN | All times |
| Web browsing | No | null | null |

FIG. 7A

702

| Devices | Prioritize network traffic? | Prioritize for which application categories? | Prioritize for certain time windows? |
|---|---|---|---|
| DJ-s-S20 | Yes | Gaming<br>Video calls<br>Audio calls | All times |
| Rach-s-S20 | Yes | All | All times |
| Rach-Laptop | Yes | Video Calls<br>Audio Calls | All times |
| Kid Laptop | Yes | Gaming | After 5 PM on weekdays, all times on weekends |
| Xbox | Yes | Gaming | All times |
| ArloHb | Yes | Cloud camera recording | Only when not home |
| iPhone | No | null | null |

FIG. 7B

704

| Top 10 Applications Categories Last Hour | Ingress Bytes | Egress Bytes | Last detected traffic |
|---|---|---|---|
| Gaming | 400 MB | 200 MB | now |
| Video calls/ conferences | 500 MB | 200 MB | now |
| Audio Calls | 20 MB | 15 MB | 15 minutes ago |
| Video Streaming | 400 MB | 100 MB | 10 minutes ago |
| Cloud Camera Recording | 600 MB | 300 MB | now |
| Web browsing | 300 MB | 100 MB | 5 minutes ago |

FIG. 7C

Real-Time Traffic Analysis and Actions Taken by the Traffic Analysis Module

808

Functions performed by the Traffic Identification and Policy Enforcement Module

CUSTOMER-CENTRIC, APPLICATION-FLOW AWARE BROADBAND SERVICE

CROSS-REFERENCE TO RELATED APPLICATIONS

The disclosure of commonly owned application Ser. No. 18/626/659, filed Apr. 4, 2024 and entitled "APPLICATION FLOW-AWARE BROADBAND SERVICE WITH DATA CAPS," is hereby incorporated by reference herein in its entirety. The disclosure of commonly owned Application Ser. No. 63/574,668, filed Apr. 4, 2024 and entitled "INTELLIGENT APPLICATION PRIORITY PACKET DELIVERY CONTROL," is hereby incorporated by reference herein in its entirety.

BACKGROUND

This disclosure is directed to systems and methods for causing network traffic corresponding to a particular category to be processed (e.g., delivered) using a queue for low latency network traffic, based at least in part on received user input.

SUMMARY

When a network link is congested, latency on the network link generally increases. Traditionally, this has often occurred primarily because of certain congestion control mechanisms utilized by a sender transmitting data on the network link, rather than due to a lack of available capacity on the network link. Such congestion control mechanisms attempt to detect currently available capacity on the network link, to allow the sender to adjust its data transmission rate accordingly. However, such congestion control mechanisms often cause queuing delay, e.g., application providers often send data too quickly for the network to queue it up.

For example, as stated in Internet Engineering Task Force (IETF), "Low Latency, Low Loss, and Scalable Throughput (LAS) Internet Service: Architecture," RFC 9330 January 2023, (referred to herein as RFC 9330), the contents of which are hereby incorporated by reference herein in their entirety, "queuing remains a major, albeit intermittent, component of latency. For instance, spikes of hundreds of milliseconds are not uncommon, even with state-of-the-art Active Queue Management (AQM) . . . . It has been demonstrated that, once access network bit rates reach levels now common in the developed world, increasing link capacity offers diminishing returns if latency (delay) is not addressed." RFC 9330 further states that "Queuing delay degrades performance intermittently . . . . It occurs i) when a large enough capacity-seeking (e.g., TCP) flow is running alongside the user's traffic in the bottleneck link, which is typically in the access network, or ii) when the low latency application is itself a large capacity-seeking or adaptive rate flow (e.g., interactive video)."

The L4S standard has been introduced to help address these issues. As stated in RFC 9330, "This document describes the L4S architecture, which enables Internet applications to achieve low queuing latency, low congestion loss, and scalable throughput control. L4S is based on the insight that the root cause of queuing delay is in the capacity-seeking congestion controllers of senders, not in the queue itself. With the LAS architecture, all Internet applications could (but do not have to) transition away from congestion control algorithms that cause substantial queuing delay and instead adopt a new class of congestion controls that can seek capacity with very little queuing. These are aided by a modified form of Explicit Congestion Notification (ECN) from the network. With this new architecture, applications can have both low latency and high throughput. The architecture primarily concerns incremental deployment. It defines mechanisms that allow the new class of L4S congestion controls to coexist with 'Classic' congestion controls in a shared network. The aim is for L4S latency and throughput to be usually much better (and rarely worse) while typically not impacting Classic performance."

Traditional single-queue buffering of Internet packets at a network component such as an access network router suffers from Head-of-line (HoL) blocking, effectively making high latency-sensitive traffic wait in a queue behind less latency-sensitive traffic, which adversely affects the customer's quality of experience (QoE). The L4S mechanism helps address this issue using dual queueing in the wide area network (WAN), with one queue dedicated to low latency packets and the other queue dedicated to classic traffic, and makes reasonable assumptions about performance of network-dependent low latency applications such as gaming, AR/VR, voice, etc. to deliver an improved service, to perform scalable congestion control.

However, while L4S attempts to do justice to highly latency-sensitive applications, it does not provide for customized broadband based on a customer's application (network traffic) needs. For example, customers may still observe buffering while watching video, or they may have skipped portion of video when continuously uploading video footage from their security cameras to the cloud, or they may experience freezing during video calls, even if they are satisfied with the broadband performance during multiplayer gaming.

Broadband Internet service is generally offered as a combination of aggregate downstream and upstream bit rates, and broadband Internet customers often decide which tier of broadband service to subscribe to based on rules of thumb related to concurrent video streaming or gaming using their devices and applications. In one approach, an Internet service provider (ISP) provides a router and enables a user to adjust settings (via a website or app provided by the ISP) for the user's home network (a local area network (LAN) provided by the router), such as to provide quality of service (QOS) control over certain applications the user uses in the home network. However, the settings options provided in relation to the ISP's router are often presented in a complex, unintuitive manner, and often include technical jargon that may not be easily understandable by an average user, who may not be technically savvy, and such an approach fails to facilitate a user-centric design. Indeed, a majority of home Wi-Fi® installations are managed Wi-Fi installs where an ISP's technician visits the user's home to set up the ISP's router, and the ISP's technician handles the configuring of settings for setting up the user's home network. Further, such approach does not impact how traffic is handled on the WAN based on subscriber settings.

There is a need for an intuitive and effective mechanism for providing customized broadband based on a customer's application (network traffic) needs, by providing the customer with the choice of which devices and/or applications are to be processed in a low latency queue, and by intelligently applying key information computed at the LAN or home network level to network traffic flows at the WAN and/or access network level.

To help overcome these issues, systems, apparatuses, and methods are provided herein for providing, using a first networking equipment, a local area network (LAN) at a particular location, wherein the LAN is connected to a wide area network (WAN) associated with a second networking equipment, and wherein each of a first queue for preferential network traffic (e.g., low latency, low loss, and scalable throughput (L4S) network traffic or other specially treated network traffic) and a second queue for non-preferential network traffic (e.g., non-L4S or other non-specially treated network traffic) is provided at least in part by the second networking equipment. The system may detect network traffic of a plurality of devices connected to the LAN, and assign each portion of a plurality of portions of the network traffic to a category of a plurality of categories. The system may receive, via a user interface, input identifying a particular category of the plurality of categories of network traffic, wherein the received input causes network traffic corresponding to the particular category to be processed on the WAN using the first queue instead of the second queue. The system may, based at least in part on detecting, at the first networking equipment, that a portion of subsequent network traffic associated with a request by a device of the plurality of devices connected to the LAN corresponds to the particular category, transmit instructions to the second networking equipment to process the portion of subsequent network traffic using the first queue instead of the second queue. In some embodiments, the first networking equipment may comprise a plurality of networking equipment devices, and/or the second networking equipment may comprise a plurality of networking equipment devices.

For example, the first networking equipment may determine when the user initiates a new application on a device in the home (LAN), and may determine a category of network traffic generated by this application. If the category of network traffic is identified as one to be processed on the WAN using the first queue, the system may transmit a rule and/or policy associated with the application/application traffic type to the second networking equipment, e.g., to cause the second networking equipment to process (e.g., deliver) WAN network traffic for such application using the first queue for preferential network traffic.

Such aspects enable customized broadband by providing an intuitive mechanism for a user (e.g., of a home LAN) to specify one or more network traffic categories (requested by networking equipment of the LAN) that should be regarded as, and processed as, preferential, e.g., to cause subsequent network traffic corresponding to the one or more categories to be processed (on the WAN, e.g., the access network) using a low latency service flow having a low latency queue. Such features abstract key information used by a subscriber to be able to make informed decisions on preferential network traffic treatment (e.g., to be given latency priority and/or bandwidth priority) through analysis of types of flows within the LAN, and enables receiving policies dynamically at a network component, which may be unaware of what occurs in an individual subscriber's home. By providing the customer the power to specify what is important to them, the ISP may not be seen as favoring one platform's traffic over another. In some embodiments, a system architecture and network policy that transfers the choice of applications to be given preferential treatment back to the customer. The subscriber chooses which applications running on which devices are most important to them. These applications are then given preferential treatment at the expense of all other applications running in the home. The ISP improves customer relationships by offering value-added functionality to their subscribers, and without running afoul of regulatory principles, since the ISP does not make any decisions to favor one traffic type over another.

In some embodiments, the systems and methods may be further configured to detect, using the first networking equipment, that a new portion of the subsequent network traffic does not correspond to the particular category, and transmit instructions to the second networking equipment to cause the second networking equipment to process the new portion of the subsequent network traffic using the second queue instead of the first queue. For example, the system may detect, using the first networking equipment, that a particular flow of network traffic previously active and identified to enter the first queue has now ended. The first networking equipment can then send an indication to the second networking equipment to remove the policy/rule having been associated with the previously active flow with the first queue.

In some embodiments, the systems and methods may be further configured to, based on receiving the input, update a data field of a data structure to indicate that the particular category of the network traffic is to be processed on the WAN using the first queue. The second networking equipment may be configured to cause the portion of the subsequent network traffic corresponding to the particular category to be processed on the WAN using the first queue by marking data associated with the portion of the subsequent network traffic with a codepoint. For example, the first networking equipment may have identified that network traffic associated with a new flow requested by a device on the LAN corresponds to the particular category for which input was received, and thus that such network traffic should be processed using the first queue.

In some embodiments, the particular category is a first category, and the plurality of categories of network traffic comprise the first category and a second category; the user interface provides an option for the first category and the second category, and the received input identifies the first category and does not identify the second category. The systems and methods may further comprise causing the data structure to indicate that the second category was not identified in the received input, wherein the instructions transmitted to the second networking equipment cause the second networking equipment to process a portion of subsequent network traffic, requested by a device of the plurality of devices connected to the LAN and corresponding to the second category, using the second queue.

In some embodiments, at least a first subset of the plurality of categories is associated with a respective type of Internet application of a plurality of types of Internet applications, and the user interface comprises a plurality of options respectively associated with the plurality of types of Internet applications, and the particular category comprises a particular type of Internet application. In some embodiments, at least a second subset of the plurality of categories is associated with a respective type of device of the plurality of devices, and the systems and methods further comprise receiving input indicating one or more devices of the plurality of devices, and the received input of the one or more devices causes the second networking equipment to process the portion of the subsequent network traffic, for the particular type of Internet application and that is requested by the one or more devices, using the first queue.

In some embodiments, at least a first subset of the plurality of categories is associated with a respective device of the plurality of devices, and the user interface comprises a plurality of options respectively associated with the plurality of devices, and the particular category comprises a particular device. In some embodiments, at least a second subset of the plurality of categories is associated with a plurality of types of Internet applications, and the systems and methods further comprise receiving input of one or more Internet application types, the received input of the one or more Internet application types causes the second networking equipment to process the portion of the subsequent network traffic, for the one or more Internet application types and that is requested by the particular device, using the first queue.

In some embodiments, the systems and methods further comprise, based on the received input, storing in a data structure a ranking of the plurality of categories of the network traffic, and the second networking equipment is configured to process portions of the subsequent network traffic using the first queue or the second queue based at least in part on the ranking stored in the data structure, based on the first networking equipment detecting that at least a portion of the plurality of categories are currently active in the subsequent network traffic, and providing such indication to the second networking equipment.

In some embodiments, the systems and methods further comprise determining a data cap for the particular category of the plurality of categories of the network traffic, and performing a particular action in relation to the portion of the subsequent network traffic based at least in part on determining that that the data cap has been reached.

In some embodiments, the systems and methods further comprise detecting the network traffic of the plurality of devices by analyzing historical patterns of the network traffic over a period of time, and providing at least one option, for which the input is received, via the user interface based on the analyzed historical patterns.

In some embodiments, at least one option, for which the input is received, is associated with whether the first queue or the second queue is to be used by the second networking equipment to process network traffic corresponding to the particular category at a particular time of day.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIGS. 7A-7C show illustrative data structures generated based on customer-specified network traffic preferences, in accordance with some embodiments of this disclosure.

DETAILED DESCRIPTION

Figure 1:
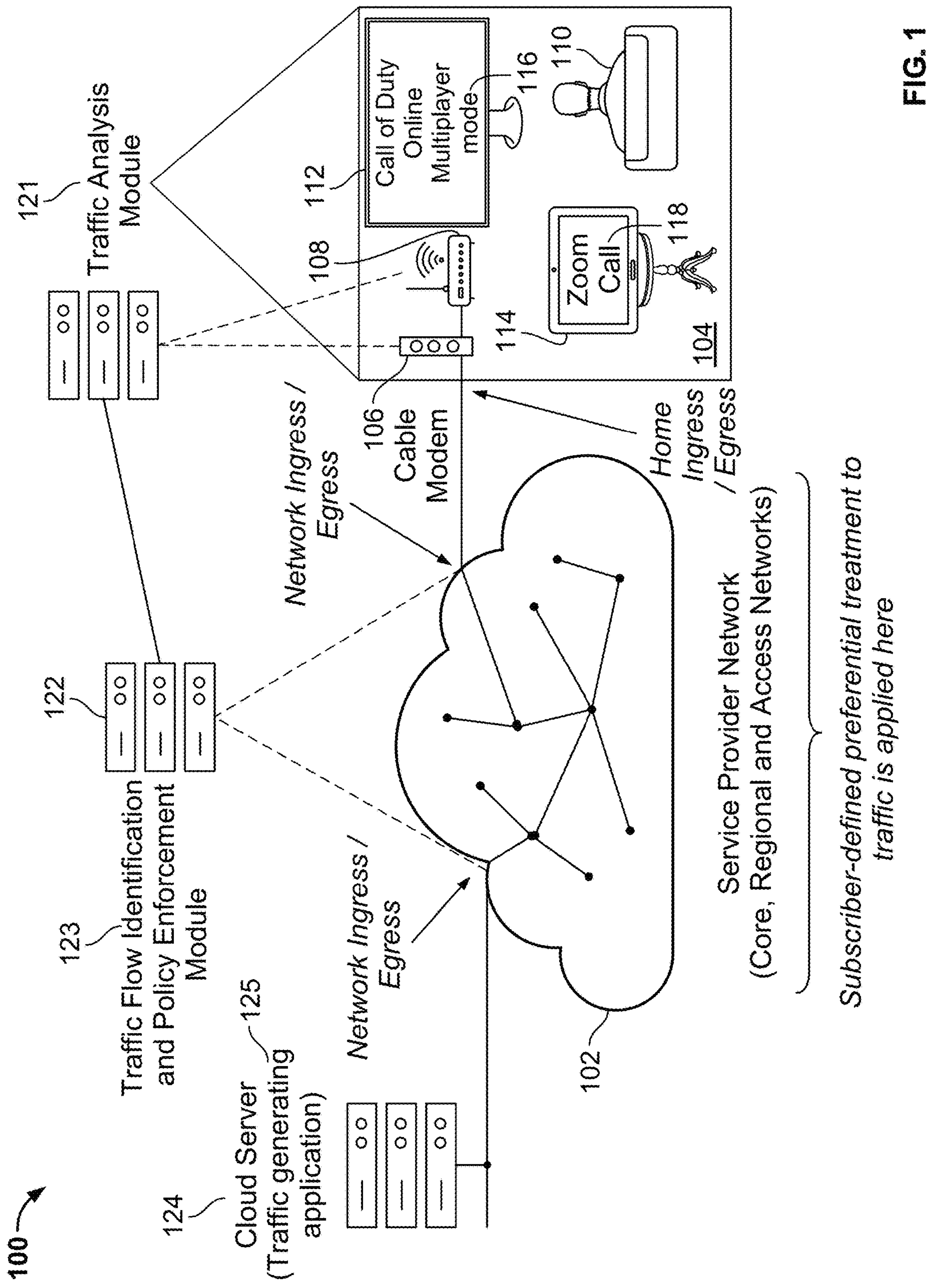
FIG. 1 shows an illustrative architecture for a system 100 for processing network traffic, intended for a device on a local area network (LAN), on a wide area network (WAN) based on received input, in accordance with some embodiments of this disclosure.

FIG. 1 shows an illustrative architecture for a system 100 for processing network traffic, intended for a device on a local area network (LAN), on a wide area network (WAN) based on received input, in accordance with some embodiments of this disclosure. System 100 may comprise service provider network 102, physical location 104 (e.g., a home of user 110, a place of business, a school, or any other suitable location, or any combination thereof), networking equipment 106 and 108 (e.g., a modem, router, switch, gateway, wireless access point, mesh access point, extender, hub, and/or any other suitable networking equipment), devices 112 and 114. In some embodiments, modem 106, router 107 and/or networking equipment 122 may comprise a traffic analysis module 121 and/or a traffic flow identification and policy enforcement module (TIPE) module 123. In some embodiments, cloud server 124 comprises a traffic generating application 125. System 100 may comprise any suitable combination of hardware and/or software to provide the functionalities described herein.

Service provider network 102 may include, for example, any suitable software and/or hardware (e.g., networking equipment, servers, and/or databases) and/or any suitable infrastructure (e.g., physical cable transmission lines, fiber-optic transmission channels or mediums, satellites) to provide core, regional, access networks and/or backhaul (and/or any other suitable portion of the network) of one or more Internet service providers (ISPs), to facilitate a telecommunications network. In some embodiments, the ISP may be provided by a business or other organization that provides access to the Internet for a fee. For example, service provider network 102 may correspond to or comprise a WAN, to facilitate Internet connectivity (or connectivity over any other suitable public or private network) between networked devices worldwide or over any other suitable geographic region or location(s), to enable such devices to exchange information and resources. In some embodiments, a WAN or service provider network 102 may be used to connect LANs (and/or other types of communication networks) to enable electronic communications between remotely located devices. In the example of FIG. 1, the LAN (e.g., a small scale network for data exchange between a group of computers or other devices at a single location) provided at location 104 by way of networking equipment 106 and/or 108 may not be considered as part of the WAN provided by service provider network 102. Service provider network 102 may provide broadband, high bandwidth Internet access.

In some embodiments, networking equipment 122 and cloud server 124 may be located remote from location 104. The devices, servers, and networking equipment of system 100 may communicate over a wired connection and wireless connection. For example, devices 112, 114 and networking equipment 106 and 108 may be equipped with antennas for transmitting and receiving electromagnetic signals at frequencies within the electromagnetic spectrum, e.g., radio frequencies, to communicate with each other over a network in a localized area. The network within location 104 may correspond to, e.g., a wireless fidelity (Wi-Fi) network, such as, for example, 802.11n, 802.11ac, 802.11ax, Wi-Gig/802.11ad, 802.11 (Wi-Fi 7) at a fronthaul of a telecommunications network, to provide wireless networking technology allowing electronic devices to connect to one another and/or the Internet from a shared network access point.

The devices of system 100 may communicate over a wired LAN and/or may communicate wirelessly over a wireless LAN (WLAN) to transmit data to and receive data from the Internet, and may be present within an effective coverage area of the localized network. The Internet is a global system of interconnected computer networks and devices employing common communication protocols, e.g., the transmission control protocol (TCP), user datagram protocol (UDP) and the Internet protocol (IP) in the TCP/IP or UDP/IP suite.

Router 108 may be configured to forward or route data packets from the Internet connection, received by way of modem 106, to devices within the localized network of system 100 and receive data packets from such devices. In some embodiments, router 108 may include a built-in modem to provide access to the Internet for the household (e.g., received by way of cable or fiber connections included in backhaul portions of a telecommunications network), built-in switches or hubs to deliver data packets to the appropriate devices within the Wi-Fi network, built-in access points to enable devices to wirelessly connect to the Wi-Fi network; and/or system 100 may include one or more stand-alone modems, switches, routers and access points. In some embodiments, modem 106 and/or router 108 may be leased from and/or installed at location 104 (e.g., the customer's premises) by the ISP as part of a managed Wi-Fi install, to give service provider network 102 visibility into LAN and WAN network traffic associated with data transmitted to or received from modem 106 of location 104.

In some embodiments, one or more applications and/or media assets may be provided to user 110 by way of wired or wireless signals transmitted through the LAN at location 104. For example, user 110 may be playing a video game 116 (e.g., "Call of Duty"®) via smart television 116 and/or a video game console, each of which may be connected to the Internet via the LAN within location 104 to provide such video game. As another example, tablet 114 may simultaneously be connected to the Internet via the LAN to provide a video conferencing application 118 (e.g., Zoom®) to user 110.

In some embodiments, devices 112 and 114 may be, for example a headset, a mobile device such as, for example, a smartphone or tablet, a laptop computer, a personal computer, a desktop computer, a smart television, a smart watch or wearable device, smart glasses, an extended reality (XR) head-mounted display (HMD), a stereoscopic display, a wearable camera, XR glasses, XR goggles, a near-eye display device, a robot, an autonomous cleaning or autonomous landscaping device, or any other suitable user equipment or device capable of connecting to the Internet or other suitable network, or any combination thereof.

In some embodiments, traffic analysis module 121 and TIPE module 123 may be implemented in conjunction to achieve one of more of the functionalities described herein. For example, traffic analysis module 121 may compute results of network traffic analysis in the LAN in real time for a subscriber home (e.g., at location 104), and TIPE module 123 may be configured to apply a policy to enable preferential treatment to customer-chosen flows at the network edge.

Figure 2A:
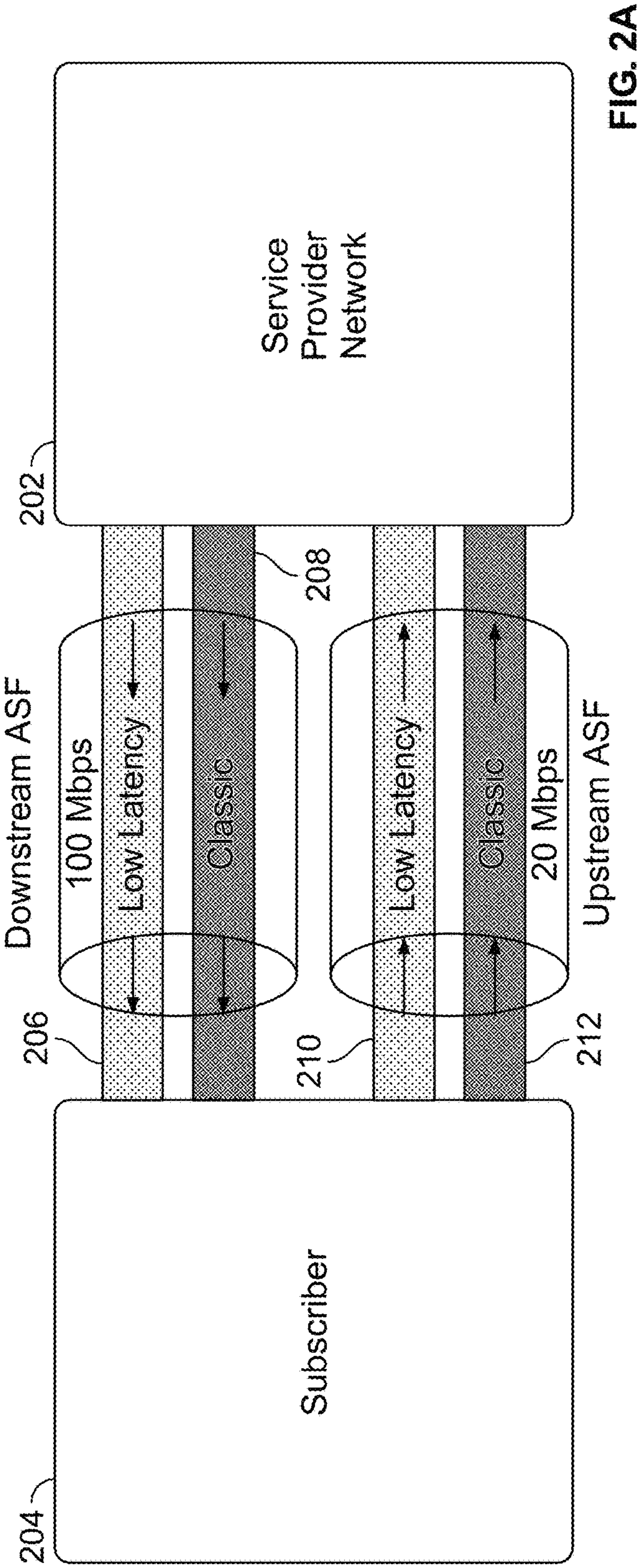
FIGS. 2A-2B show illustrative block diagrams for providing a dual queue service configuration, in accordance with some embodiments of this disclosure.
Figure 2B:
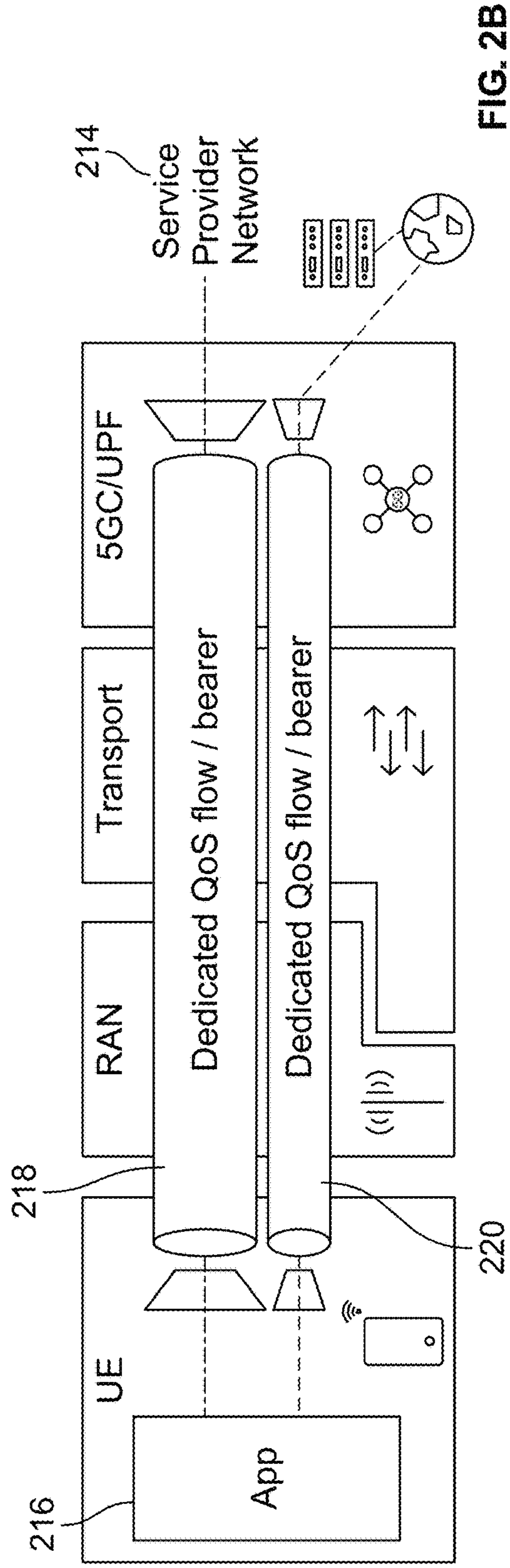

FIGS. 2A-2B show illustrative block diagrams for providing a dual queue service configuration, in accordance with some embodiments of this disclosure. System 100 may provide (e.g., in the WAN) a queue for low latency (e.g., L4S) network traffic and a queue for classic traffic, based at least in part on using networking equipment 122 of FIG. 1. For example, the low latency queue of system 100 may be associated with low latency service flow 206 and low latency service flow 210, and the classic queue of system 100 may be associated with classic queue of classic service flow 208 and 212, as discussed in more detail in White et al., "Low Latency DOCSIS: Technology Overview," Cable Labs, 2019 Fall Technical Forum SCTE-ISBE (hereinafter "White et al.), the contents of which are hereby incorporated by reference herein in their entirety. A downstream aggregate service flow (ASF) over service flow 206, 210 between subscriber 204 and service provider network 202 may include low latency service flow 206 and classic service flow 208, and an upstream ASF between subscriber 204 and service provider network 202 may include low latency service flow 210 and classic service flow 212. In some embodiments, networking equipment 122 and/or other networking equipment may provide one or more buffers or other suitable memory at which the low latency queue and the classic queue may be stored. In some embodiments, system 100 may employ per-flow queues and/or per-flow AQMs, in addition to or in the alternative to dual queuing.

In some embodiments, service provider network 202 may correspond to service provider network 102 of FIG. 1, networking equipment 122 and/or 124, and subscriber 204 may correspond to networking equipment 106, 108 of user 110 at location 104 of FIG. 1. FIG. 2B may correspond to an architecture for a cellular network, service provider network 214 may correspond to service provider network 102 of FIG. 1, and client device or user equipment 216 may correspond to service provider network 102 of FIG. 1, networking equipment 122 and/or cloud server 124.

L4S provides an end-to-end solution to provide certain traffic flows, such as, for example, gaming or voice, with reduced latency. With LAS, the data source and/or data recipient may execute congestion control algorithms to efficiently utilize available capacity while minimizing latency and packet loss, where the data source may use congestion feedback received from the recipient to optimize data transmission. With L4S, the header of an IP packet may indicate, via an explicit congestion notification (ECN), whether the IP packet supports L4S and whether congestion is being experienced, e.g., marking specific packets as having queuing delay that exceeds a threshold. L4S may be implemented at the transport layer by the service provider network and/or application service providers at client and server. In some embodiments, L4S may be enabled by operating system (OS) providers, such as Google and Apple, on client device applications as well as application servers.

As stated in RFC 9330, "The Dual-Queue Coupled AQM . . . acts like a 'semi-permeable' membrane that partitions latency but not bandwidth. As such, the two queues are for transitioning from Classic to L4S behaviour, not bandwidth prioritization." RFC 9330 further states that "Two separate queues are used to isolate L4S queuing delay from the larger queue that Classic traffic needs to maintain full utilization" and "The two queues act as if they are a single pool of bandwidth in which flows of either type get roughly equal throughput without the scheduler needing to identify any flows."

RFC 9330 further states that "the scheduler can serve the L4S queue with priority (denoted by the '1' on the higher priority input), because the L4S traffic isn't offering up enough traffic to use all the priority that it is given. Therefore, for latency isolation on short timescales (sub-round-trip), the prioritization of the L4S queue protects its low latency by allowing bursts to dissipate quickly; but for bandwidth pooling on longer timescales (round-trip and longer), the Classic queue creates an equal and opposite pressure against the L4S traffic to ensure that neither has priority when it comes to bandwidth—the tension between prioritizing L4S and coupling the marking from the Classic AQM results in approximate per-flow fairness."

As further stated in White et al., AQM can ensure that the classic queue is not starved: "To enable the Low Latency Queue to rapidly dequeue an arrived burst of traffic, the Inter-Service-Flow scheduler gives a higher weight to the Low Latency Queue than it does to the Classic Queue. The coupling to the Low Latency AQM counterbalances the weighted scheduler by making low-latency applications leave space for Classic traffic. This ensures that the weighted scheduler does not give priority over bandwidth, as a traditional weighted scheduler would." Further, as stated in Internet Engineering Task Force (IETF), "Dual-Queue Coupled Active Queue Management (AQM) for Low Latency, Low Loss, and Scalable Throughput (L4S)," RFC 9332 January 2023, (referred to herein as RFC 9332), the contents of which are hereby incorporated by reference herein in their entirety: "The scheduling weight of the Classic queue should be small (e.g., 1/16) . . . if L4S traffic is over-aggressive or unresponsive, the scheduler weight for Classic traffic will at least be large enough to ensure it does not starve in the short term" and "The scheduler draining the two queues MUST give L4S packets priority over Classic, although priority MUST be bounded in order not to starve Classic traffic" and "The L4S queue has latency priority within sub-round-trip timescales, but over longer periods the coupling from the Classic to the L4S AQM . . . ensures that it does not have bandwidth priority over the Classic queue."

As described in more detail below, system 100 may be configured to deliver a customized broadband to a customer (e.g., user 110 of FIG. 1) based on received user input. For example, system 100 may orchestrate network flows such that customer-specified traffic (e.g., assuming the traffic is LAS-capable) is directed to the low latency service flow associated with the low latency queue, and/or that traffic that is not customer specified (e.g., whether L4S-capable or not L4S-capable) is directed to the classic service flow. In some embodiments, any traffic that is LAS is directed to the low latency service flow (regardless of whether the traffic is specified by the user as preferred), or only traffic that is both specified by the user and that is L4S-capable is directed to the low latency service flow. Such directing of traffic to the low latency service flow based on user input gives the user some measure of control to cause certain packets to be processed with minimal delay, e.g., by the system shifting, based at least in part on receiving the input, a portion of network traffic indicated by the customer as being of high importance to a low latency service flow or dedicated quality of service (QOS) service flow while keeping the remaining traffic in the classic or default QoS service flow. For example, as part of the L4S mechanism, system 100 may facilitate L4S packets being given latency priority over classic packets for at least certain periods of time, to minimize latency for such packets. In some embodiments, system 100 may use L4S in conjunction with one or more other techniques, e.g., Differentiated services (DiffServ), to forward packets via low latency service flow at the expense of packets over the classic service flow. In some embodiments, if a particular traffic flow is not L4S-capable, based on receiving selection of a particular traffic flow by a user, system 100 may cause an ISP and/or application provider to be informed of the request, which may cause the ISP and/or application provider to configure the network traffic to be L4S-capable. In some embodiments, system 100 may receive or transmit API calls requesting that an ISP or application provider enable L4S for certain network traffic, e.g., user-specified traffic.

Figure 3:
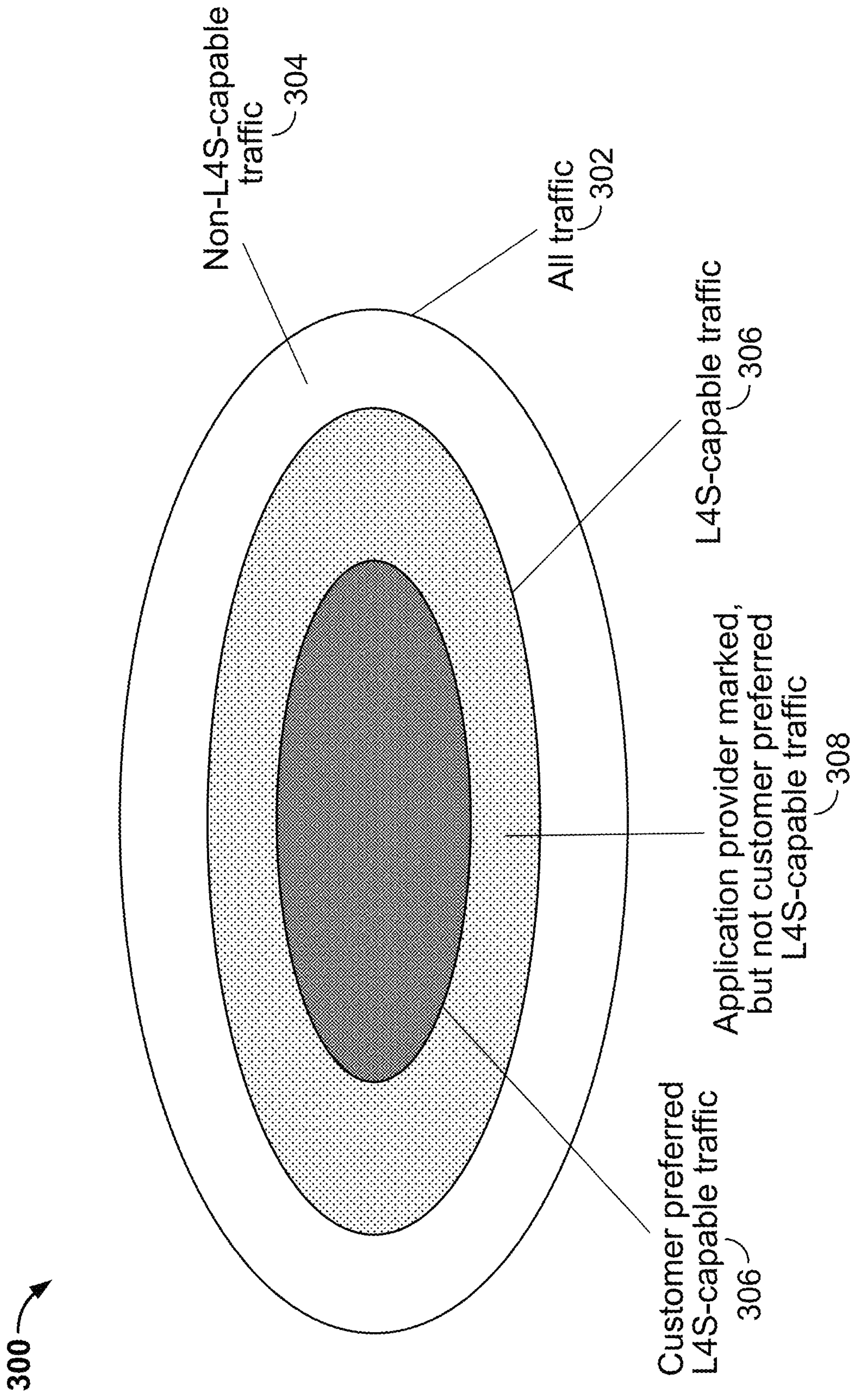
FIG. 3 shows an illustrative diagram of network traffic in a system, in accordance with some embodiments of this disclosure.

FIG. 3 shows an illustrative diagram 300 of network traffic in system 100, in accordance with some embodiments of this disclosure. In some embodiments, system 100 may utilize the L4S standard, and/or any other suitable standard or techniques. As shown in FIG. 3, system 100 may categorize network traffic 302 as non-L4S-capable traffic 304 or L4S-capable traffic 306. L4S-capable traffic 306 may comprise customer preferred L4S-capable traffic 306 and application provider marked, but not customer preferred, L4S-capable traffic 308.

Table 1 below shows illustrative markings of ECN bits, in accordance with some embodiments of this disclosure.

| Binary Codepoint | Codepoint name | Meaning |
|---|---|---|
| 00 | Non-ECT | Not ECN-capable transport |
| 01 | ECT(1) | L4S-capable transport |
| 10 | ECT(0) | ECN-capable transport |
| 11 | CE | Congestion experienced |

In some embodiments, to determine whether a packet should be assigned to a low latency service flow (e.g., 206, 210, 218 of FIGS. 2A-2B), ISPs and/or application providers of low latency traffic (e.g., cloud gaming) of system 100 may mark portions of their traffic with a codepoint, e.g., a DiffServ codepoint or any other suitable codepoint, based on whether the network traffic is capable of being designated as such and/or based on input received from a user (e.g., user 110 of FIG. 1). This codepoint indicates the application provider's ability to perform scalable congestion control, e.g., to respond to a congestion notification in a graceful manner that does not aggressively reduce throughput. For example, the ISP or application provider may use the DiffServ field information to shift a packet to the low latency service flow in a "weakest link" of the network, such as, for example, the access network. In some embodiments, the ISP or application provider may signal congestion using an ECN field when appropriate, to produce a graceful degradation in throughput from the application provider's server. In some embodiments, an ISP and/or application service provider may allow a customer to indicate that network traffic to a particular device and/or for a particular application, e.g., based on a particular service type associated with the application, should be provided with latency priority, e.g., assigned to the low latency service flow.

In some embodiments, ECN may be contained within the DiffServ codepoint to indicate whether or not congestion is experienced by marking the two least significant bits in the DiffServ in the IP header identifying a data packet. For example, ECN bits may be contained within the DiffServ codepoint, and the most significant six bits in the DiffServ field may contain the Differentiated Services Code Point (DSCP) bits, and the state of the two ECN bits indicates whether or not the packet is an ECN-capable packet and whether or not congestion has been experienced. A sender of network traffic may indicate a packet as ECN-capable or not ECN-capable based on whether the sender is ECN-capable. If an ECN-capable packet experiences congestion at the egress queue of a switch, router, and/or network component, such switch, router, and/or other network component may mark the packet as experiencing congestion. When the packet reaches the ECN-capable receiver (destination endpoint), the receiver echoes the congestion indicator to the sender (source endpoint) by sending a packet marked to indicate congestion, and after receiving the congestion indicator from the receiver, the source endpoint reduces the transmission rate to relieve the congestion, as described in "Understanding CoS Explicit Congestion Notification," Juniper Product and Release Support, Nov. 29, 2023, the contents of which are hereby incorporated by reference herein in their entirety.

In some embodiments, two ECN bits in the DiffServ field provide four codes that determine if a packet is marked as an ECN-capable transport (ECT) packet, meaning that both endpoints of the transport protocol are ECN-capable, and if there is congestion experienced (CE). Historically, codes 01 and 10 had the same meaning, namely that the sending and receiving endpoints of the transport protocol are ECN-capable, and there was no difference between these codes. Recent work, however, earmarks ECT(1) as the bit pattern for L4S-capable traffic. System 100 may modify such interpretation of the ECN bits by assigning distinct meanings to ECT(0) and ECT(1) in order to designate at least two different traffic classes. In some embodiments, ECT(1), e.g., bit pattern 01, may be used to indicate L4S-capable traffic, and ECT(0), e.g., bit pattern 10, may be used to indicate that the sender is capable of receiving explicit congestion notification (though the sender may not be compliant with L4S). In some embodiments, L4S-capable traffic marked by an application server may be assigned to ECT(1) and L4S-capable traffic marked by an ISP (e.g., based on received input and/or customer preferences) may be assigned to ECT(0). In some embodiments, ISPs can independently choose which bit combination represents one of the two classes described above, or multiple ISPs can agree on the definition and/or choice of ECT(0) and ECT(1). In some embodiments, ISPs can choose ECT(0) as a bit pattern for internal reference. In some embodiments, system 100 may add one or more extra bits to be added, specifically to indicate whether such a data packet having such bits was marked by an ISP operator or application service provider providing L4S enablement.

In some embodiments, the same bits that are used for designating whether the client-server are ECN-capable may also be used for marking whether congestion is actually experienced in the network (bits 11: CE). Thus, if a packet has the ECN bits marked as CE, then, in order to classify it as marked either by the application provider or by the ISP, (to meter the traffic accurately and apply policy), the ISP may perform a lookup of that flow identifier (ID) from a prior packet belonging to the same network traffic flow to check its traffic class, to determine whether the sender packet was marked with 10 or 01.

Figure 4:
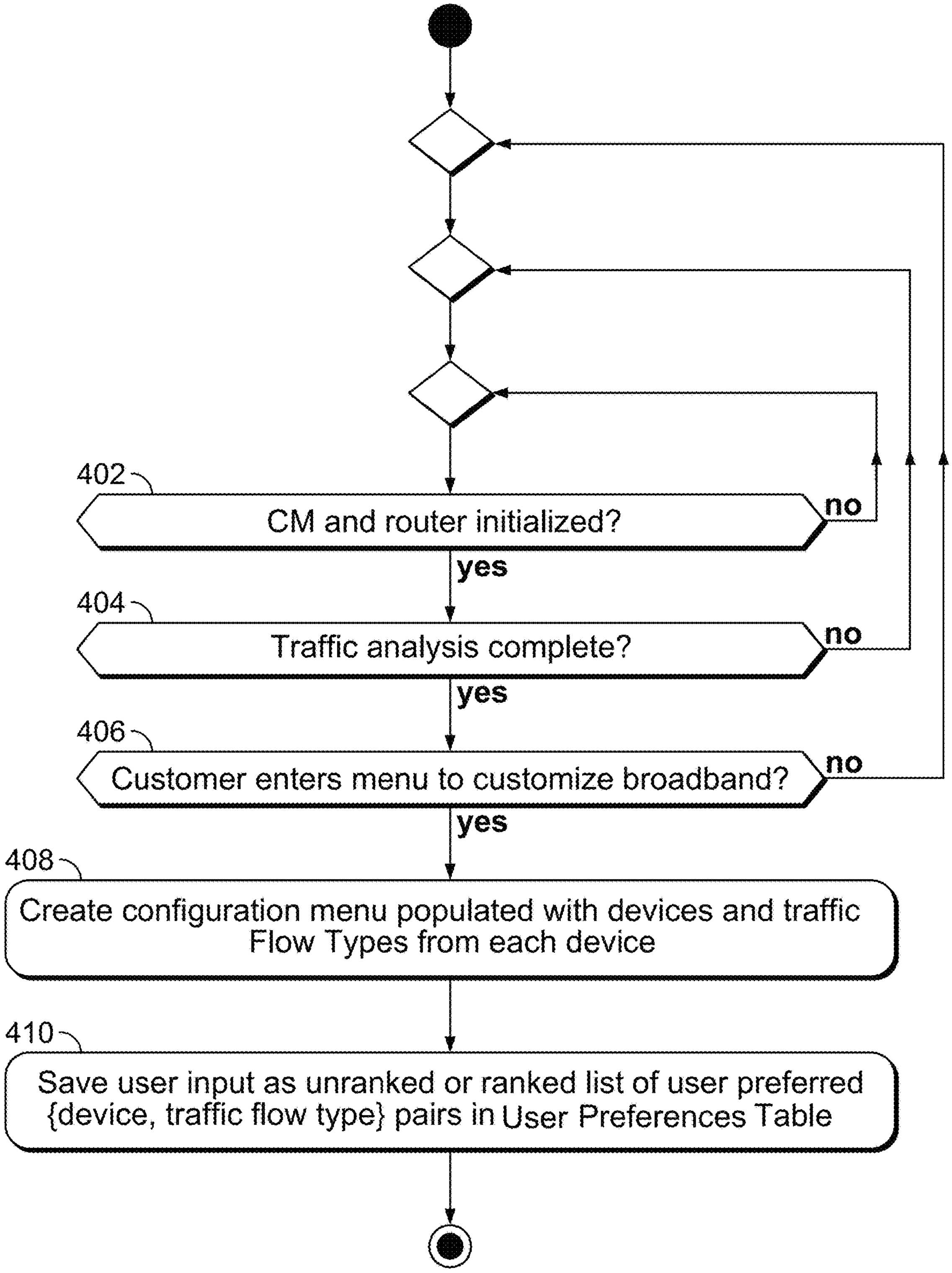
FIG. 4 shows an illustrative flowchart for customizing broadband traffic for a customer, in accordance with some embodiments of this disclosure.

FIG. 4 shows an illustrative flowchart 400 for customizing broadband traffic for a customer, in accordance with some embodiments of this disclosure. In various embodiments, the individual steps of process 400 may be implemented by one or more components of the devices, methods, and systems of FIGS. 1-3 and 5A-12 and may be performed in combination with any of the other processes and aspects described herein. Although the present disclosure may describe certain steps of process 400 (and of other processes described herein) as being implemented by certain components of the devices, methods, and systems of FIGS. 1-3 and 5A-12, this is for purposes of illustration only, and it should be understood that other components of the devices, methods, and systems of FIGS. 1-3 and 5A-12 may implement those steps instead.

At 402, system 100 may determine whether networking equipment (e.g., cable modem 106 and/or router 108 of FIG. 1) is initialized, e.g., properly configured and functioning and powered on. At 404, system 100 may analyze ingress or egress traffic at the home/subscriber level (e.g., location 104 of user 110) to classify network traffic flows into categories using any suitable technique. In some embodiments, traffic analysis module 121 may classify and/or infer a category of network traffic in real time, e.g., within a few seconds. For example, traffic analysis module 121 may analyze headers of data packets of network traffic (e.g., one or more fields of data and values identifying the data packet and/or attributes thereof), IP addresses, device identifiers, universal resource locators (URLs), metadata of data packets of network traffic, payloads of data packets of network traffic, packet sizes and packet interarrival times, or any other suitable data associated with network traffic, to identify one or more categories for a portion of network traffic. In some embodiments, one or more machine learning techniques and/or heuristic-based techniques and/or packet inspection techniques may be used to categorize network traffic. In some embodiments, system 100 may employ techniques to categorize network traffic as described in Huang et al., "Research on QoS Classification of Network Encrypted Traffic Behavior Based on Machine Learning," Electronics 2021, 10, 1376, the contents of which are hereby incorporated by reference herein in their entirety. In some embodiments, one or more deep packet inspection (DPI) techniques may be used for packet classification to categorize network traffic such as, for example, as described in Bujlow et al., "Independent Comparison of Popular DPI Tools for Traffic Classification," Computer Networks, Volume 76, 15 Jan. 2005, pages 75-89, the contents of which are hereby incorporated by reference herein in their entirety.

Traffic analysis module 121 may lay the foundation for the customer to customize their Internet experience. For example, traffic analysis module 121 may run for any suitable period of time (e.g., a few days, weeks or months) so that the traffic patterns observed by traffic analysis module 121 are sufficient for at least a reasonably comprehensive characterization. In some embodiments, traffic analysis module 121 identifies, tracks, records, and/or stores any suitable data related to the detected network traffic, e.g., an identified category, a time of the network traffic, a device's name, a device's media access control (MAC) address, a device's IP address, types of traffic flows originating or terminating in the device, related information, e.g., statistical summaries and measures of session/activity time, and/or bandwidth (e.g., an amount of data a network connection can accommodate in a given period of time) usage, and/or any other suitable data, or any suitable combination thereof. The IP address may provide a structured format for uniquely specifying an identity of, location of, and/or routing detail for, a node on a network, e.g., with a numerical value or other identifier.

In some embodiments, system 100 may uniquely identify a network traffic flow using a 5-tuple, {IP address (source, destination), protocol, port (source, destination)}, e.g., system 100 may operate on the assumption that a precise traffic flow is therefore unidirectional. In some embodiments, traffic analysis module 121 may pair unidirectional flows together by observing the IP addresses and port numbers (switched for opposite directions), and traffic analysis module 121 may map each {device, application flow} entry in a data structure (e.g., user preference table 700 of FIG. 7A or 702 of FIG. 7B, or any other suitable data structure) to two unique unidirectional traffic flows. In some embodiments, the presentation of the user interfaces of customization menus (FIGS. 5A-5D and 6A-6D) to the customer may abstract the technical detail for ease of customization.

In some embodiments, traffic analysis module 121 may be implemented locally in location 104 (e.g., a home of user 110) on networking equipment 106 or 108, e.g., on a router, cable modem or a combined cable modem-router device called an all-in-one-gateway (AWG). Additionally or alternatively, traffic analysis module 121 may be implemented at any suitable portion of service provider network 102 of FIG. 1 and. For example, traffic analysis module 121 may be implemented at a cable modem termination system (CMTS), a central office (CO), and/or at a datacenter in the regional area network or core network, and/or at cloud server 124 (e.g., if the ISP provisions its compute resources for traffic analysis outside its own network). In some embodiments, modem 106 and/or router 108 may be configured to provide information from the domain of location 104 to traffic analysis module 121, to enable traffic analysis module 121 to perform the analysis on a subscriber-by-subscriber basis. For example, modem 106 and/or router 108 may send key information for each traffic flow, such as, for example, packet sizes, interarrival times, or any other suitable data, or any combination thereof, to traffic analysis module 121.

FIGS. 5A-5D and FIGS. 6A-6D show illustrative user interfaces 502, 504, 506, and 508, and 602, 604, 606, and 608, respectively, provided by system 100, in accordance with some embodiments of this disclosure. At 404 and 406, based on traffic analysis module 121 characterizing and/or categorizing current network traffic (and/or any suitable portion of historical network traffic) of system 100, system 100 may provide one or more of user interfaces 502, 504, 506, 508, 602, 604, 606, and/or 608 of FIGS. 5A-5D and FIGS. 6A-6D to a device. For example, such user interface(s) may be provided to device 112 or 114, or any other suitable device (e.g., which may or may not be connected to the LAN at location 104, and/or which may be associated with a user profile of user 110 with an ISP providing Internet service to location 104). For example, user interfaces 502, 504, 506, 508, 602, 604, 606, and/or 608 may be provided via an application or website provided by an ISP and/or a networking equipment provider (e.g., router configuration settings). When a user enters the customization menus of FIGS. 5A-5D and 6A-6D to customize their broadband, traffic analysis module 121 may provide device names and application flow types to populate the user interfaces.

Figure 5A:
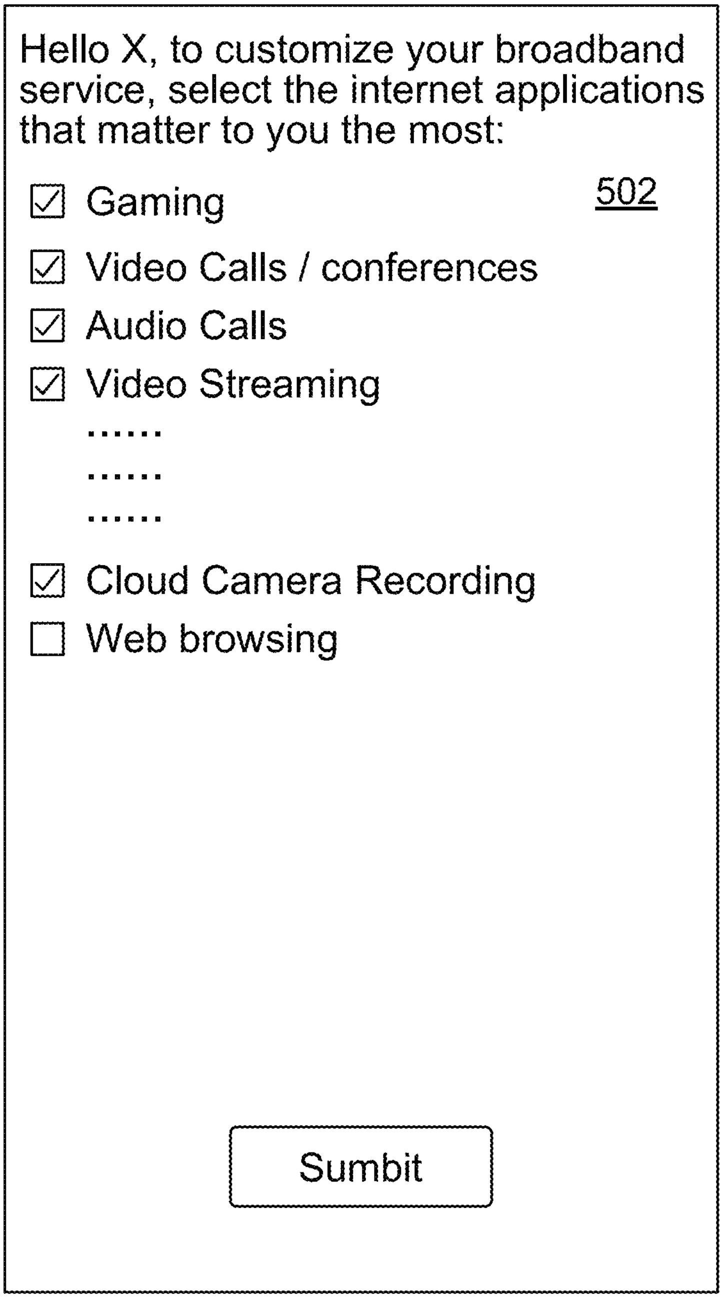
FIGS. 5A-5D show illustrative user interfaces provided by a system, in accordance with some embodiments of this disclosure.

The user interfaces of FIGS. 5A-5D and FIGS. 6A-6D may be provided by system 100 to enable a customer (e.g., user 110 of FIG. 1) to customize their broadband Internet experience. In some embodiments, one of more of user interfaces 502, 504, 506, 508, 602, 604, 606, and/or 608 may be populated based on the categorized network traffic. For example, at 408, system 100 may create a configuration menu populated with devices and/or traffic flow types from each device. As shown in FIG. 5A, system 100 may provide a list of application categories (e.g., gaming, video calls/conferences, audio calls, video streaming, cloud camera recording, web browsing, cryptocurrency mining, and/or any other suitable application categories) that one or more users in the LAN of location 104 frequently or previously accessed (or are otherwise candidates to be accessed).

User interface 502 may receive input (e.g., via a touchscreen, voice command, mouse click, keyboard input, keypad input, biometric input, or any other input) to indicate which network traffic categories should be regarded as, and processed as, preferential. As used herein, preferential treatment to network traffic may be understood as network traffic that is to be processed using a low latency service flow (e.g., 206, 210 of FIG. 2A, or 218 or FIG. 2B) as opposed to a classic service flow (e.g., 208, 212 of FIG. 2A, or 220 of FIG. 2B), and/or assigned latency priority and/or bandwidth priority relative to network traffic processed using the classic service flow. For example, the checkmarks for gaming, video calls, and cloud camera recording at user interface 502 may cause network traffic for such selected application categories to be treated as preferential over other application categories (e.g., the unselected audio calls, video streaming, and web browsing categories). In some embodiments, user interface 502 may additionally or alternatively present options to treated as preferential specific applications (e.g., Zoom, Xbox, Netflix, YouTube TV, and/or any other suitable applications) and/or specific media assets (e.g., episodes of "Game of Thrones" or certain scenes thereof, the video game "Call of Duty" or certain portions thereof, New York Yankees games or certain portions thereof and/or any other suitable media assets). In some embodiments, certain applications, devices, or media assets may be treated as preferential automatically (or their corresponding options autofilled) or otherwise recommended for preferential treatment, such as, for example, based on learned preferences and/or historical activity (e.g., amount of time accessing a particular category of traffic or bandwidth consumed in accessing such category of traffic) for one or more users of the LAN of location 104. In some embodiments, the options at the user interfaces may be ranked (e.g., based on learned preferences and/or historical activity for one or more users of the LAN of location 104, such as in order of user preference from most important to least important) or unranked.

Figure 5B:
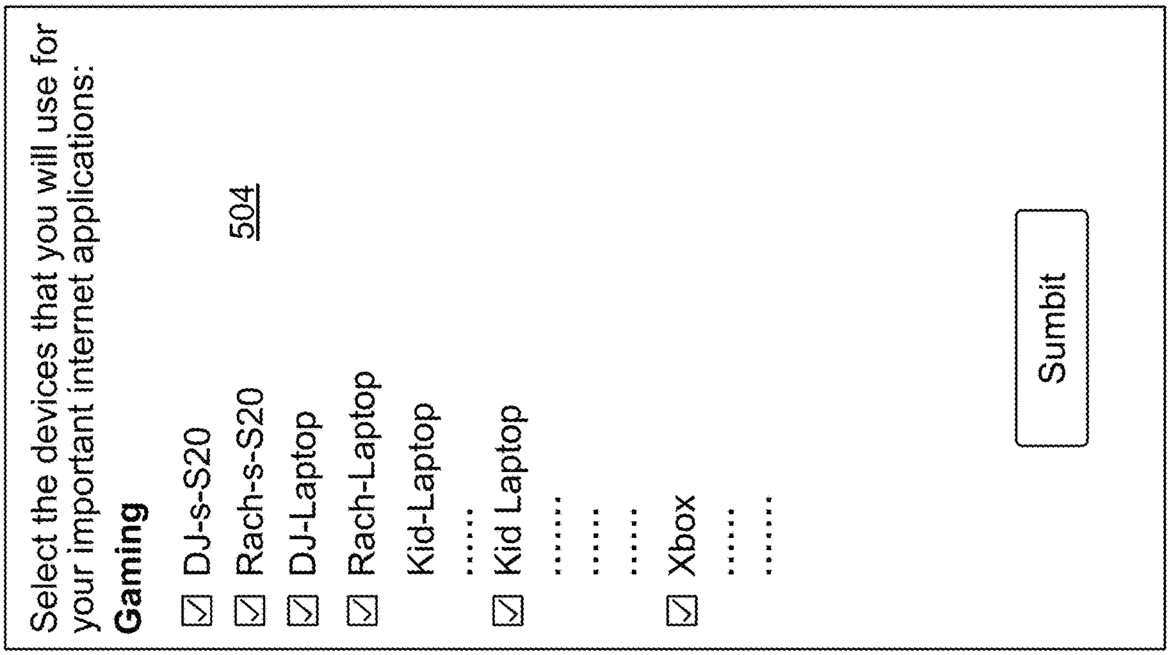

At 410, system 100 may store or save selections received at user interface 502 in memory, e.g., as an unranked or ranked list of user preferred {application flow type, device}, {device, application flow} pairs, or {device, traffic flow type} pairs in a user preferences table (e.g., data structure 700 of FIG. 7A or 702 of FIG. 7B). In some embodiments, after guiding the user initially to select applications and/or traffic flows in FIG. 5A, system 100 may subsequently, at user interface 504 of FIG. 5B, prompt the user to select one or more devices (or users or user profiles) for which network traffic of each application category or type(s) selected at FIG. 5A should be treated preferentially. For example, as shown in FIG. 5B, user interface 504 may receive input indicating that network traffic for gaming should be treated preferentially in each device of the LAN. In some embodiments, user interface 504 may further provide options to set certain time windows, during which a certain application type should be treated preferentially (e.g., only prioritize gaming on weekdays after 5:00 PM when a workday ends, and/or on weekends), and/or certain conditions, during which an application type should be treated preferentially (e.g., prioritize gaming, only if no applications associated with work, such as Microsoft Teams or Zoom, or associated with another specified category, are currently being used).

Figure 5C:
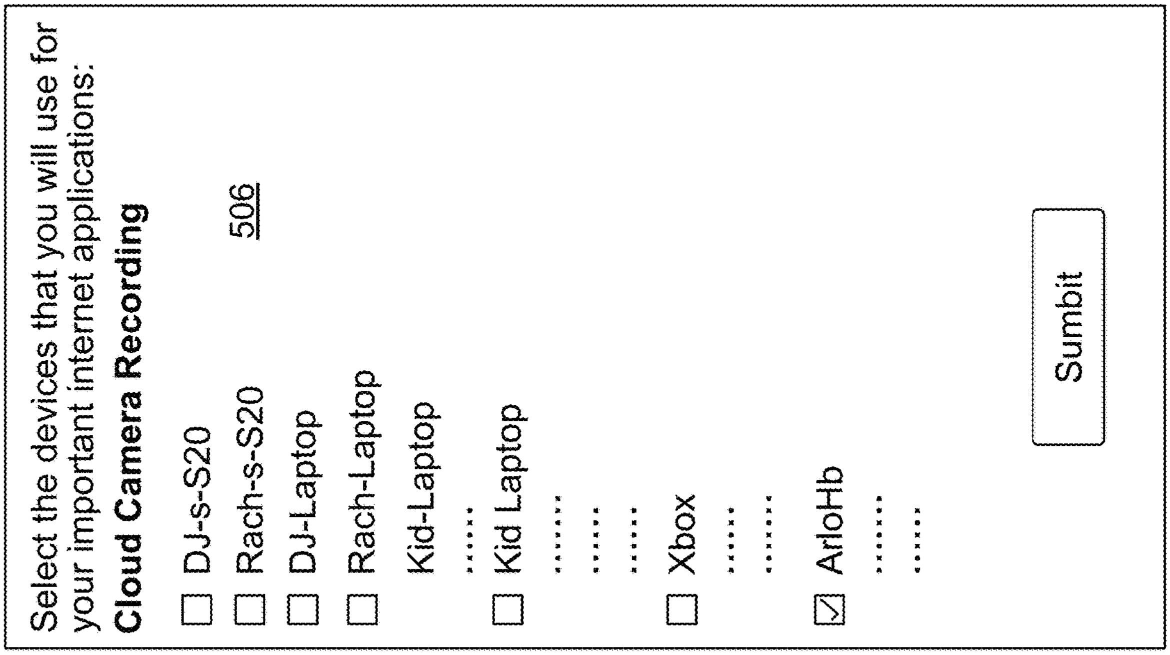

As another example, as shown in FIG. 5C, user interface 506 may receive input indicating that network traffic for cloud camera recording should be treated preferentially only on a single device (e.g., ArloHb) or another suitable subset of devices. In some embodiments, system 100 may automatically select or recommend or prefill only certain options (e.g., ArloHb) associated with a device having a primary function corresponding to a particular category (e.g., an Arlo camera may be primarily concerned with capturing images or video with a camera). As another example, system 100 may automatically select or recommend or prefill only certain options (e.g., Xbox) associated with a device having a primary function corresponding to a particular category (e.g., an Xbox may be primarily used for gaming).

Figure 5D:
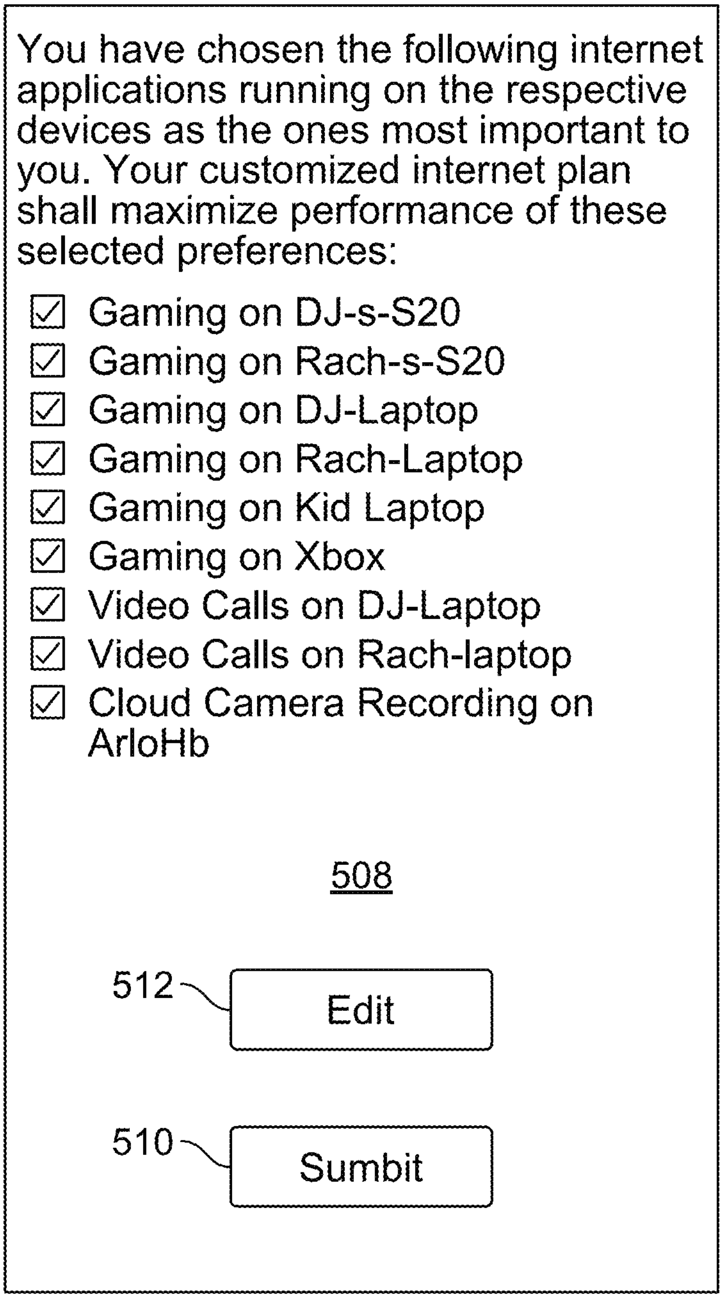

In some embodiments, as shown in user interface 508 of FIG. 5D, system 100 may present for final confirmation (e.g., by selecting option 510) or editing (e.g., by selecting option 512) each of the options selected in user interfaces 502, 504, and 506 of FIGS. 5A-5D. For example, upon selecting option 510, the selections made in user interfaces 502, 504, and 506 of FIGS. 5A-5D may be implemented by system 100 to treat preferentially network traffic in accordance with such selections. After system 100 receives the user selections via the user interfaces of FIGS. 5A-5D and 6A-6D, data associated with such selection(s) may be stored in a data structure, e.g., a user preferences table 700 of FIG. 7A or 702 of FIG. 7B. Based on such selections, instructions may be forwarded to TIPE module 123, and system 100 may use this information to configure the customer's gateway (e.g., cable modem and/or router) to provide them with a customized broadband service.

In some embodiments, receiving input via one or more of the user interfaces of FIGS. 5A-5D and 6A-6D may cause the user's preferences to be applied across all devices in location 104 of the LAN. In some embodiments, system 100 may recommend common settings and allow the user to populate settings across devices, e.g., when a new device joins.

FIGS. 6A-6D may present user interfaces 602, 604, 606, and 608 which may be similar to user interfaces 502, 504, 506, and 508 of FIGS. 5A-5D, except selection of devices for which network traffic should be treated preferentially occur prior to selection of an application category or specific application to be treated preferentially. For example, user interface 602 of FIG. 6A may present a plurality of devices detected in the LAN of location 104 of FIG. 1 as having accessed the Internet via networking equipment 106 and/or 108 and registered network traffic. In some embodiments, the devices may be ranked, e.g., based on an amount of time of Internet use, or an amount of bandwidth consumed by a device, such that more frequently used devices appear first or at a more prominent position, and less frequently used devices appear towards the bottom of the list or at a less prominent position. In some embodiments, the devices may be ranked based on whether the device is primarily used in association with a same user that is accessing user interface 602, e.g., if the device being used to access user interface 602 corresponds to a device on the list, such device may be ranked first with respect to a top of the screen, or otherwise prominently displayed.

Figure 6A:
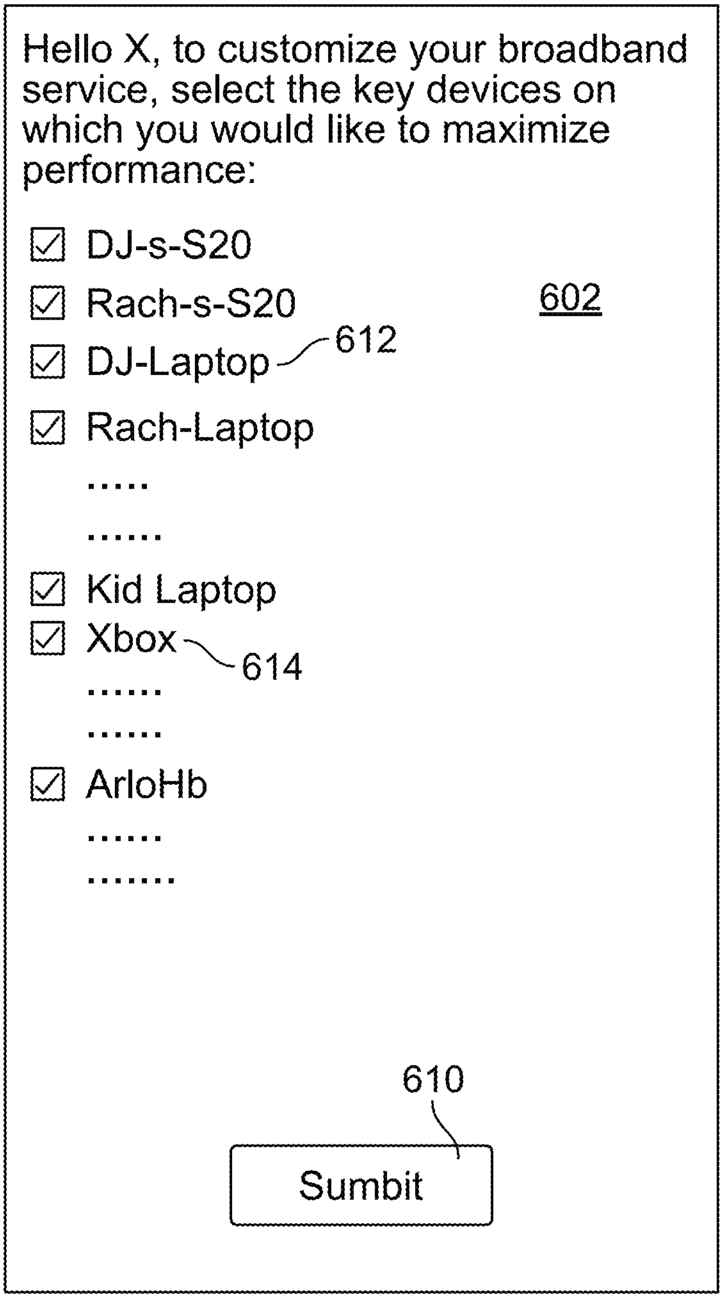
FIGS. 6A-6D show illustrative user interfaces provided by a system, in accordance with some embodiments of this disclosure.
Figure 6B:
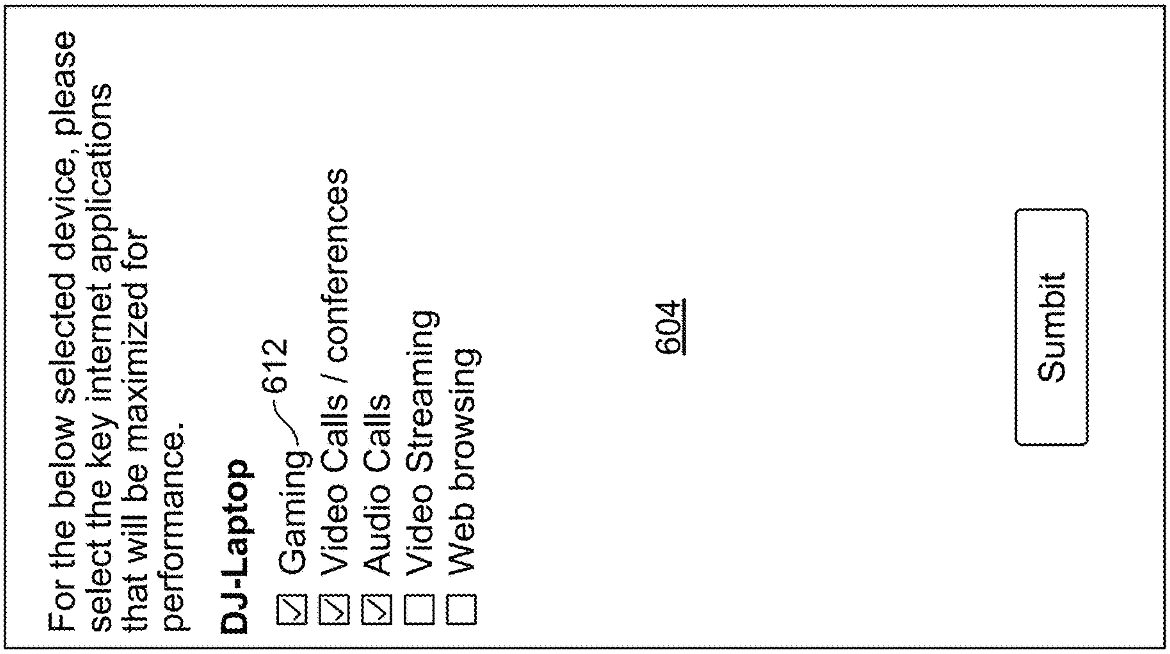
Figure 6C:

As shown in FIG. 6A, system 100 may receive selection of one or more devices for which network traffic is to be treated preferentially. In some embodiments, selection of the submit option 610, or selection of a particular device 612 or 614 (e.g., "DJ-Laptop" indicating a name of the user and an identification of the device type, or "Xbox") may cause an additional screen to be presented, such as, for example, user interface 604 of FIG. 6B to specify further options in relation to device 612 selected via user interface 602, and/or user interface 606 of FIG. 6C to specify further options in relation to device 614 selected via user interface 602. For example, system 100 may receive input via user interface 604 indicating that, for device 612, network traffic for gaming, video calls/conferences, and audio calls should be treated preferentially and that network traffic for video streaming and web browsing should not be treated preferentially. In some embodiments, the user interfaces of FIGS. 5A-5D and 6A-6D may provide an option for specifying an order in which network traffic should be treated preferentially, e.g., among application categories or particular devices or device categories. For example, based on current network conditions, system 100 may determine that only one of gaming or video calls can be treated preferentially for device 612 or across all selected devices, and system 100 may dedicate network resources (e.g., latency or bandwidth) to treat preferentially network traffic for video calls (e.g., since the user may indicate, or system 100 may otherwise infer, that video calls are work-related and should take precedence) over gaming.

As another example, system 100 may receive input via user interface 604 indicating that, for device 612, network traffic for gaming, video calls/conferences, and audio calls should be treated preferentially and that network traffic for video streaming and web browsing should not be treated preferentially. In some embodiments, options on user interfaces 604 and/or 606 may be prepopulated, e.g., gaming may be recommended for selection for Xbox 614, since metadata for Xbox 614 may indicate that generally gaming is primarily what users use an Xbox for, and/or based on determining that users in location 104 primarily use Xbox 614 for gaming.

Figure 6D:
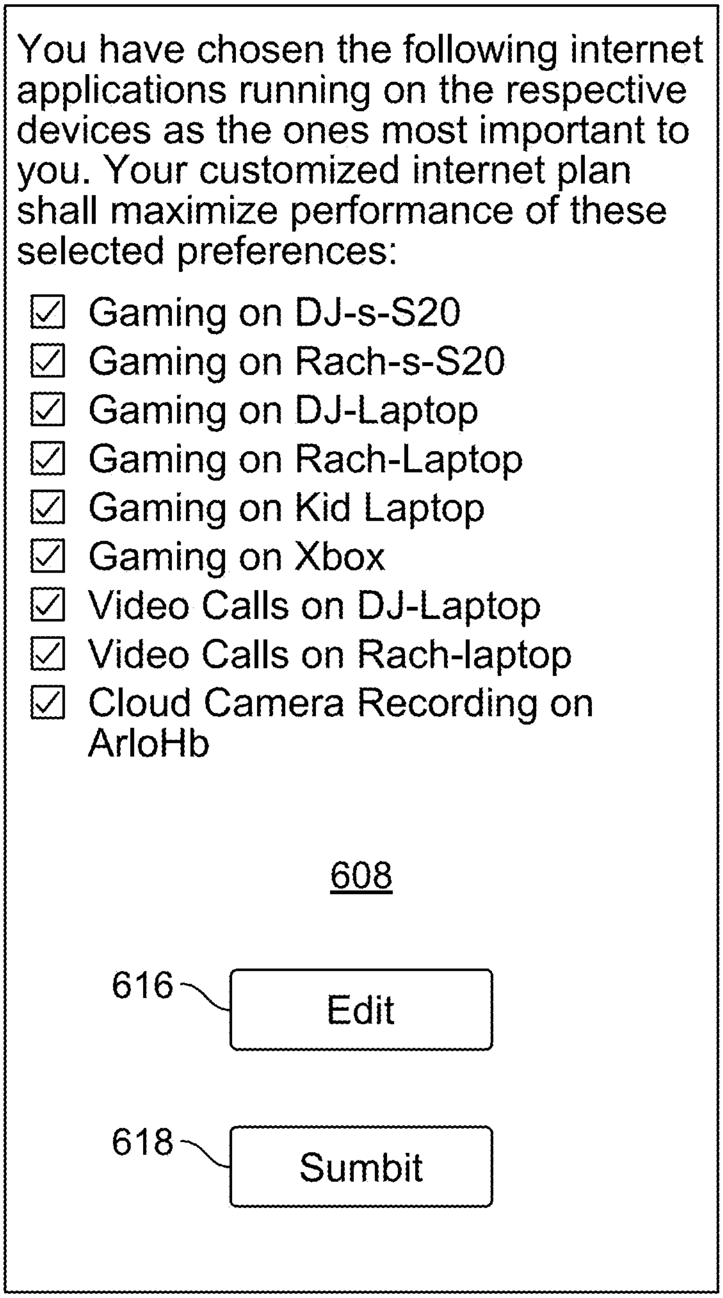

As shown in FIG. 6D, user interface 608 may present each of the selections received via user interfaces 602, 604, and 606 and provide option 616 to edit such selections, and option 618 to submit such selections as the user's selections regarding network traffic to be treated preferentially. Based on such selections, data may be stored (e.g., at data structure 702 of FIG. 7B) and corresponding instructions may be forwarded to TIPE module 123 when a flow is detected in the LAN that matches an application category with a relevant rule/policy. For example, it may be desirable to store data structures for respective users at least in part on LAN devices, such that when flow is detected in the LAN, the policy may be sent to the WAN and applied dynamically, when a relevant flow is observed.

In some embodiments, user preferences can be built and modified over time. Traffic analysis module 121 may, upon detecting a new {device, application flow} pair within the home, use threshold logic such as, for example, frequency with which traffic sessions are detected, times for which these sessions last, bitrate, proportion of the application contributing to total tonnage (upstream or downstream or both), or any other suitable factor, or any combination thereof, to determine whether a likelihood exists that the application behind the traffic flow is significant. If traffic analysis module 121 determines that the application flow is significant, traffic analysis module 121 may query the user whether they would like to add this {device, application flow} pair to the preferred Internet applications set. For example, this may occur if a user enters the service provider app or web login, or a service provider may proactively signal this to a user, for example, using push notifications on their mobile device. The user's acceptance to treat the application on the device as important may create a new entry in the user preferences table. Similarly, the traffic analysis module may also perform "garbage collection" by determining whether certain preferred Internet applications on certain preferred devices are no longer active, such as, for example, when the flows are not detected for a significant period of time. In some embodiments, based on user response, those entries may be purged from the user preferences table.

In some embodiments, the system may allow the user more customization options, such as, for example, choosing a duration within a day (e.g., a time window by specifying start and end times) or choosing days of the week in which certain traffic should be given preferential treatment. In this case, the entries are activated/enabled in the user preferences table in the selected time window(s). Once the window passes, the entries may be deactivated by traffic analysis module 121 or another intelligent network component. Traffic flow may change over time as devices/apps become active or idle, and in competing with others for limited resources, priorities may be different in the AM and PM, and input received from a user (or settings set automatically by the system) may leverage this observation for each device and/or application preferential settings. In some embodiments, a temporary upgrade or downgrade on a device/app can be allowed, e.g., within a time window.

In some embodiments, one or more of the user interfaces of FIGS. 5A-5D and 6A-6D may provide options for the user to assign a weight to each device and application pair, or a subset thereof. Such granularity may help to identify which devices or apps are better candidates to move from the classic queue to the low-latency queue when resources become available.

FIGS. 7A-7C show illustrative data structures 700 and 702 generated based on customer-specified network traffic preferences, in accordance with some embodiments of this disclosure. For example, data structure 700 of FIG. 7A reflects user selections made via user interfaces 502, 504, 506, and 508 of FIGS. 5A-5D, and data structure 702 of FIG. 7B reflects user selections made via user interfaces 602, 604, 606, and 608 of FIGS. 6A-6D.

Data structures 700 and 702 may be stored at, for example storage or memory of networking equipment 106 and/or 108, networking equipment 122, and/or cloud server 124. The system may translate data from data structure 700 of FIG. 7A to obtain {device, application flow} pairs, and may translate data from data structure 702 of FIG. 7B to obtain {application flow type, device} pairs, and traffic analysis module 121 may transmit instructions to TIPE module 123 based on detecting that a request from a device on the LAN is associated with network traffic corresponding to one or more of such {device, application flow} or {application flow type, device} pairs. In some embodiments, data may be stored in data structures 700 and 702 of FIGS. 7A-7B in the format of a {application flow type, device} pair and/or a {device, application flow} pair. In some embodiments, such pair(s) may have temporal priority, as indicated in the last column of FIGS. 7A-7B, to indicate that network traffic corresponding to such pair(s) should be treated preferentially during the specified time windows.

FIG. 7A, data structure 700 may indicate, for each application category identified by traffic analysis module 121, whether to treat preferentially network traffic transmitted by or received by the application, and if so, for which devices (or device categories) network traffic of the application category is to be treated preferentially, and whether such network traffic should be treated preferentially at all times or only during certain time windows. As shown in FIG. 7B, data structure 702 may indicate, for each device identified by traffic analysis module 121, whether to treat preferentially network traffic transmitted by or received by the device, and if so, for which application categories (or particular applications) network traffic of the application category is to be treated preferentially, and whether such network traffic should be treated preferentially at all times or only during certain time windows.

Figure 8:
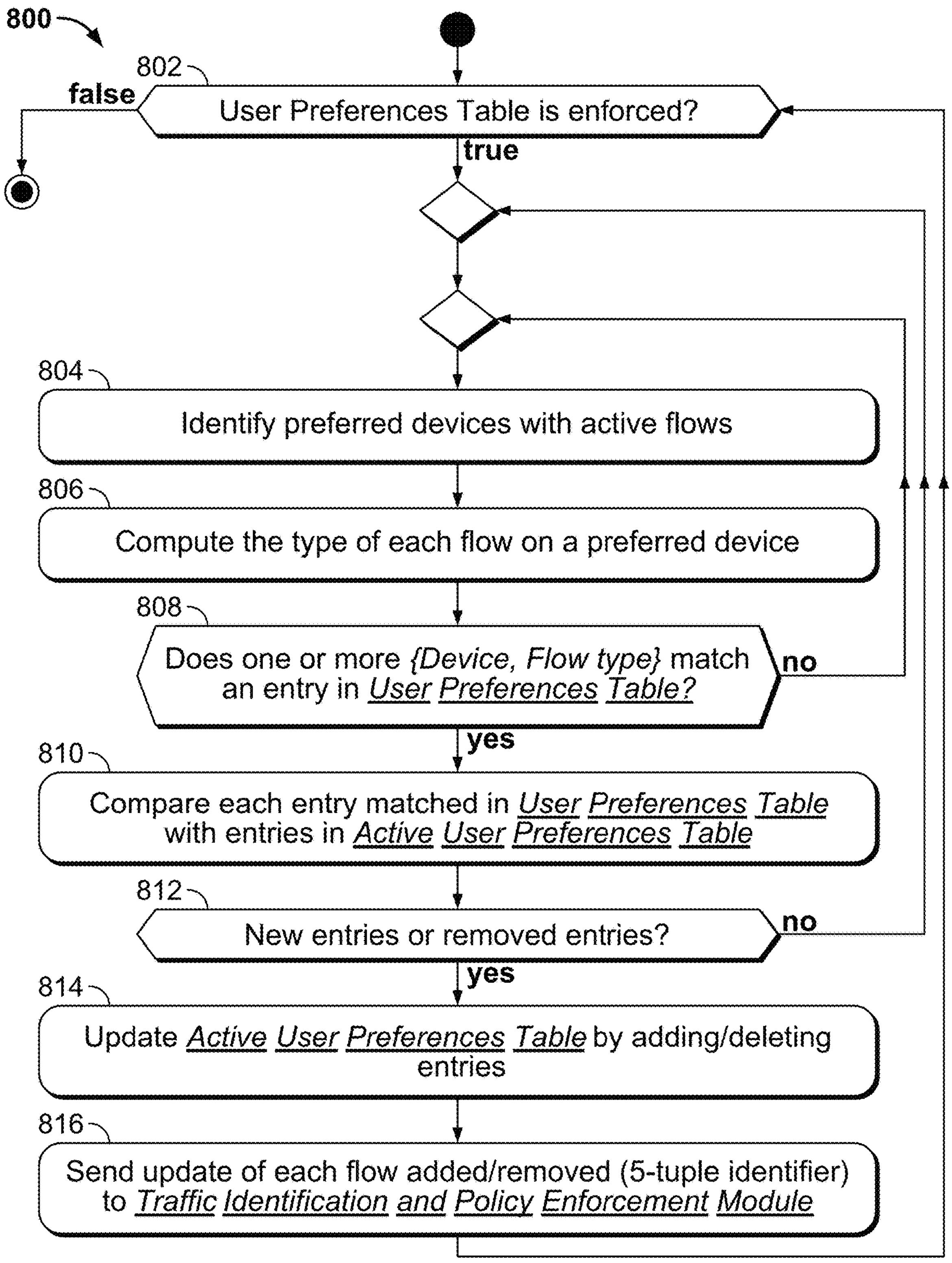
FIG. 8 shows an illustrative flowchart for customizing broadband traffic for a customer, in accordance with some embodiments of this disclosure.

FIG. 8 shows an illustrative flowchart 800 for customizing broadband traffic for a customer, in accordance with some embodiments of this disclosure. In various embodiments, the individual steps of process 800 may be implemented by one or more components of the devices, methods, and systems of FIGS. 1-7 and 9-12 and may be performed in combination with any of the other processes and aspects described herein. Although the present disclosure may describe certain steps of process 800 (and of other processes described herein) as being implemented by certain components of the devices, methods, and systems of FIGS. 1-7 and 8-12, this is for purposes of illustration only, and it should be understood that other components of the devices, methods, and systems of FIGS. 1-7 and 8-12 may implement those steps instead.

At 802, system 100 may determine to enforce the user preferences table (e.g., data structures 700 and 702 of FIGS. 7A-7C), and after the user preferences table has been populated with customer-provided information, system 100 (e.g., via traffic analysis module 121) may analyze home ingress/egress traffic in real time. For example, as shown at 804-808, system 100 may identify preferred devices (or preferred device types, preferred applications or preferred application types) having currently active network traffic flows and compute a type of each flow on the preferred device (or the preferred device types, the preferred applications or the preferred application types). At 808, the system may determine whether one or more of {device, application flow type}, {device type, application flow type}, {application type, device or device type}, or {application, device or device type} pairs in the current, active network traffic matches an entry in the user preferences table (e.g., data structures 700 and 702 of FIGS. 7A-7B). Such currently active application traffic flows (that were previously identified by the customer as taking precedence or otherwise having importance) may be stored in an active user preferences table, e.g., a data structure that is modified in real time as user activity associated with the LAN occurs at location 104 of FIG. 1. An affirmative determination at 808 may cause processing to proceed to 810; otherwise, processing may return to 804.

At 810, system 100 may compare each matched entry determined at 808 with entries in the active user preferences table, to determine at 812 whether one or more entries are new or have been removed. For example, at 812 and 814, system 100 may determine to add new entries to an active user preferences table (e.g., data structure 704 of FIG. 7C) based on determining that a new application traffic flow (e.g., gaming) matches an entry in the user preferences table (e.g., data structure 700 of FIG. 7A or data structure 702 of FIG. 7B). As another example, at 812 and 814, system 100 may cause one or more entries to be removed from the active user preferences table if a traffic flow, determined to be associated with an importance and/or precedence (e.g., based on the user preferences table), is determined to be no longer active (e.g., audio calls or web browsing).

At 816, system 100 may transmit indications of one or more updates to the active user preferences table to networking equipment (e.g., TIPE module 123) and/or cloud server 124 (e.g., a traffic generating application 125). For example, an update made to the active user preferences table may then be cascaded to TIPE module 123. In some embodiments, the observed traffic in real time represents a home device IP address and/or port as a source or as a destination, and both the 5-tuple, {IP Address (Source, Destination), Protocol, Port (Source, Destination)} associated with the traffic flow may be sent.

In some embodiments, traffic analysis module 121 of FIG. 1 may be configured to collect information on a per-subscriber basis. For example, traffic analysis module 121 may be aware of (e.g., store a data structure indicating information related to) devices connected to the LAN of location 104, and their IP addresses (and/or other identifying information, traffic information, metadata, and/or any other suitable information), even if one or more of the IP addresses are allocated dynamically using dynamic host configuration protocol (DHCP). In some embodiments, traffic analysis module 121 may be aware of a public IP address of location 104, and if router 108 performs network address translation (NAT), traffic analysis module 121 may be aware of the NAT table, which may allow the traffic analysis module 121 to provide accurate 5-tuple information of a traffic flow originating or terminating from a specific device in location 104.

Figure 9:
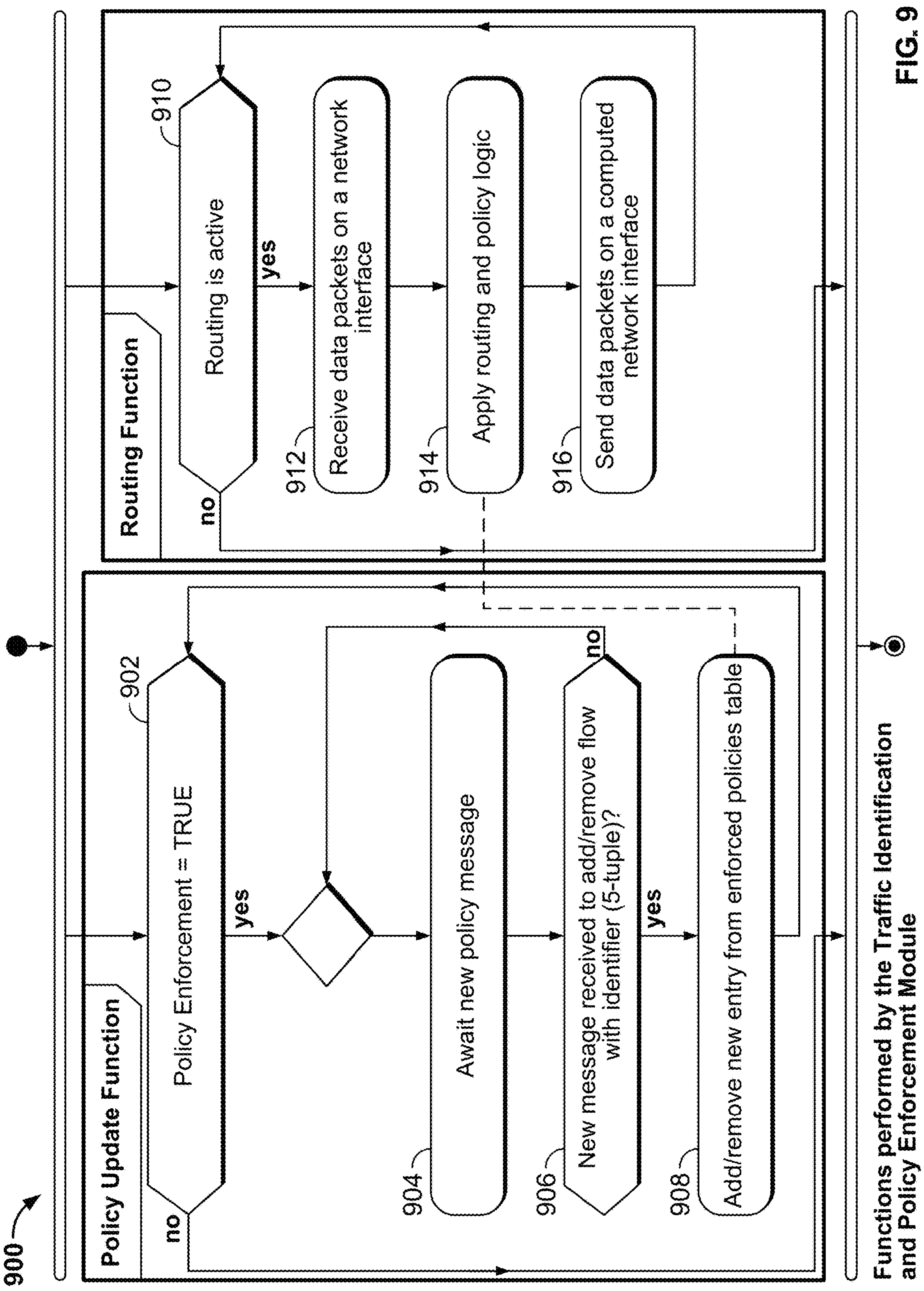
FIG. 9 shows an illustrative flowchart for customizing broadband traffic for a customer, in accordance with some embodiments of this disclosure.

FIG. 9 shows an illustrative flowchart 900 for customizing broadband traffic for a customer, in accordance with some embodiments of this disclosure. In various embodiments, the individual steps of process 900 may be implemented by one or more components of the devices, methods, and systems of FIGS. 1-8 and 10-12 and may be performed in combination with any of the other processes and aspects described herein. Although the present disclosure may describe certain steps of process 900 (and of other processes described herein) as being implemented by certain components of the devices, methods, and systems of FIGS. 1-8 and 10-12, this is for purposes of illustration only, and it should be understood that other components of the devices, methods, and systems of FIGS. 1-8 and 10-12 may implement those steps instead.

In some embodiments, TIPE module 123 of FIG. 1 may be implemented at a logical edge of service provider network 102 of FIG. 1, and/or at the subscriber side (e.g., implemented at networking equipment 106 and/or 108 (e.g., an AWG). In some embodiments, a side of the network provided by service provider network 102 may be peered or interconnected to an application service provider or a carrier network, and on such side of the network, TIPE module 123 may be implemented at a point of presence (POP) at the peering and/or interconnect point. In some embodiments, TIPE module 123 may be implemented at endpoints of a link (e.g., an access network link such as, for example, a cable modem (CM) and cable modem termination system (CM-CMTS) or user equipment gNodeB/evolved node B (UE-gNB/eNB). In some embodiments, TIPE module 123 may be implemented at the network edge. In some embodiments, TIPE module 123 may be implemented at only one end of the link, while the other node may mirror the DiffServ codepoint for packets in the opposite direction. In some embodiments, TIPE module 123 may be implemented at, or in least in part at, a WAN of service provider network 102 of FIG. 1.

At 902, TIPE module 123 may determine to enforce a policy to treat preferentially one or more portions of network traffic (e.g., based on user selections received via the user interfaces of FIGS. 5A-5D and 6A-6D) associated with a subscriber LAN, and 904, may await a new policy message. At 906, TIPE module 123 may provide a policy update function, which determines whether updates are received from traffic analysis module(s) 121 on a per-subscriber basis, and these updates may inform whether a new traffic flow, indicated for preferential treatment by a customer, has just become active or inactive/terminated. In some embodiments, such updates may be received as a 5-tuple pair identifying the unique flow with a home device IP address (e.g., of location 104 of FIG. 1) as the source or destination (with flow type), and/or identifying a reciprocal flow in the opposite direction. In some embodiments, classification of traffic flow may be based at least in part on analyzing traffic in the direction in which most of the packets flow, and the reciprocal traffic in the opposite direction may also be classified to the same type (e.g., a mirrored stream classification service).

At 908, TIPE module 123 may determine that the message received at 906 comprises a new traffic flow identifier and/or an indication to add an entry to an enforced policies table (e.g., based on user selections received via the user interfaces of FIGS. 5A-5D and 6A-6D). Based on such determination, and based on determining at 910 that routing is active and that data packets have been received at a network interface at 912, TIPE module 123 may apply routing and policy logic at 914 to update one or more policies to apply an indication, e.g., a DiffServ codepoint, to each packet belonging to the traffic flow (e.g., the 5-tuple pair). Such features enable network traffic in the WAN (e.g., being routed through service provider network 102 through networking equipment 122 and/or cloud server 124 of FIG. 1) having been marked with the DiffServ codepoint, and having a routing destination of the LAN of location 104 or having been routed from the LAN of location 104, to be routed (at 916) via a low latency service flow (e.g., 206 or 210 of FIG. 2A) associated with a low latency L4S queue. In some embodiments, the ECN bits contained in the DiffServ codepoint may be changed to a specific value used as an internal reference by the ISP to denote customer preferred traffic flow (such as ECT(0)).

In some embodiments, if TIPE module 123 receives a message at 906 to remove an entry from the enforced policies table, TIPE module 123 may cause a DiffServ Codepoint to no longer be applied to a packet belonging to that traffic flow.

In some embodiments, when TIPE module 123 marks a packet with a DiffServ codepoint (e.g., a DiffServ value 0x2A for non-queue-building traffic in L4S), a subsequent network component may place this packet in a low latency queue (e.g., 206 or 210 of FIG. 2A, for L4S-capable traffic) that is different from a queue for classic traffic (e.g., 208 or 212 of FIG. 2A). For example, such low latency queue may be a low latency service flow or a dedicated QoS service flow in the access network, and this queue may (for at least certain periods of time) be treated preferentially over the classic or default service flow queue in packet forwarding, thus reducing latency. In some embodiments, the classic and low latency queues are designated for queue-building and non-queue-building (NQB) traffic, respectively. While a scheduler can continue to use the queue for NQB traffic, any user indicated pair, e.g., {device, application flow}, can be given preferential treatment by assigning it to the low latency queue. In some embodiments, the system may utilize a mechanism such as, for example, coupled active queue management (AQM) to ensure that the classic queue receives a minimum amount of network traffic, as described in White et al.

In some embodiments, while the classic queue may drop a packet to signal congestion to the application host, implicitly requesting an aggressive reduction in packet arrival rate, the low latency queue provides a "soft" congestion signal by marking an ECN field. This propagates back to the sender, which responds to the congestion signal, albeit gracefully, rather than aggressively, reducing throughput and latency.

For TIPE module 123 to utilize L4S, the sender may be programmed to respond to an ECN signal in a manner that gracefully reduces throughput (unlike throughput reduction due to a packet drop), and thus in system 100, the sender may respond appropriately to an ECN signal. L4S may be inclusive to other non-TCP protocols such as QUIC, or any other suitable protocol (e.g., RTP, TCP, QUIC) as long as the sender behavior is modulated to respond to an ECN. Even if some application providers decide not to implement scalable congestion at their end, a queue protection function in the dual queue implementation accounts for such behavior, as described in White et al.

In some embodiments, VR and AR and/or gaming network traffic can benefit from a separate low latency service flow. In some embodiments, other traffic may also benefit, e.g., adaptive bitrate (ABR) streaming for video and/or multimedia applications, if implemented on the low latency service flow, may reduce buffering time and minimize or avoid intermittent quality drops by ensuring a consistent throughput. As described herein, in some embodiments, the customer, rather than the service provider, chooses what is to be delivered with low latency and low throughput loss, which may improve customer and ISP relationships, and may face fewer regulatory hurdles in certain jurisdictions, as it is preferential treatment behavior defined by the customer rather than the service provider.

While the techniques described herein can help apply preferential treatment to network traffic that is important to a customer on the WAN (e.g., an access network), similar techniques for applying preferential treatment to network traffic may be employed in an LAN (e.g., inside a home). In some embodiments, the techniques described herein may be used in conjunction with in-home traffic preferential treatment and/or QoS policies. For example, within the home, Wi-Fi 6 may define multi-priority queueing through Wireless Multimedia (WMM), or Wi-Fi 7 has Restricted Service Periods (RSP) for offering deterministic latency to some flows (router vendors have also implemented proprietary QoS management schemes). In some embodiments, other portions of the ISP network, such as, for example, network traffic corresponding to a category specified by the user may be preferentially treated in a regional or metropolitan network, or the core network. In some circumstances, ISPs upgrade fiber link capacity when utilization is between 50-75%. In some embodiments, if the ISP lets the traffic level on fiber links reach a point where it is close to full utilization, traffic prioritization using dual queuing/L4S can be applied to the core network fiber links as well, to benefit the customer experience.

In some embodiments, when a ranked list of customer-preferred, e.g., {device, application flow} pairs, is available, system 100 may further cause an access network component (e.g., CMTS, CM) to further re-order the queue by placing each new packet in order of its {device, application flow} priority level/rank, e.g., based on the received user preferences. The net effect of placing each new packet after a packet with a higher {device, flow} rank and before a packet with a lower {device, flow} rank may be multi-level priority queueing. While in many cases, the ability of the customer to select several flows for preferential treatment may depend on business logic, the system may impose the below constraint to restrict the number of flows that can be selected:

$$\frac{\sum \text{Preferred Flow Bitrates}}{\sum \text{All Flow Btirates}} \leq \frac{\text{Low Latency Queue Buffer Size}}{\text{Total Queue Buffer Size}}$$

In this inequation, the bitrates may be peak sustained bitrates. Thus, the ratio of sum of peak sustained bit rates of selected preferential treatment flows to the sum of peak sustained bit rates of all flows generally may be smaller than the ratio of the lower latency queue buffer size to the total queue buffer size. In some embodiments, the right hand side of the inequation applies to the network's "weakest link" such as, for example, an access network router/CMTS or cable modem.

Figure 10:
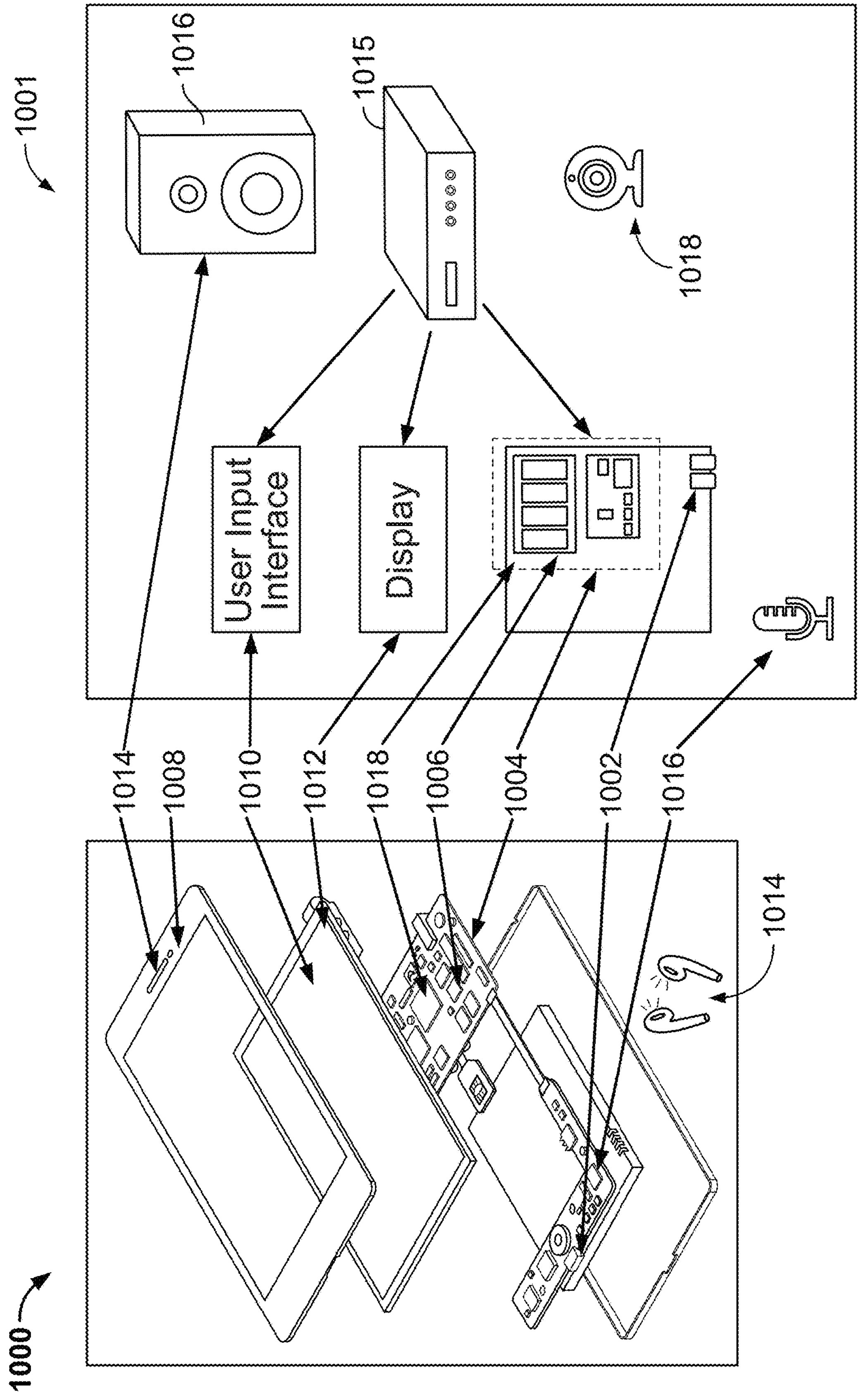
FIGS. 10-11 show illustrative devices and systems for implementing, on a WAN, preferential treatment of network traffic corresponding to data requested by a device on a LAN, in accordance with some embodiments of this disclosure.
Figure 11:
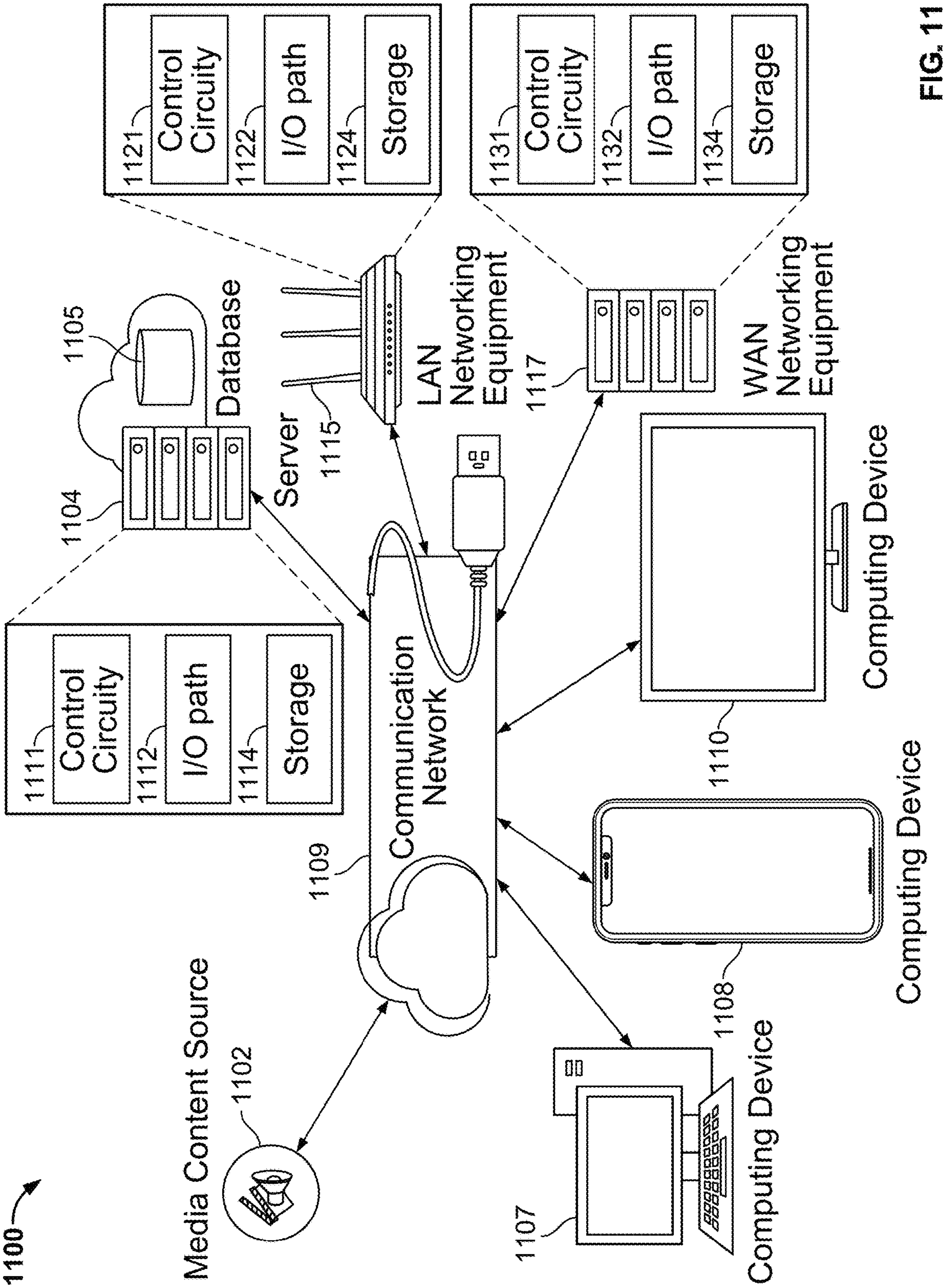

FIGS. 10-11 show illustrative devices, systems, servers, and related hardware for implementing, on a WAN, preferential treatment of network traffic corresponding to data requested by a device on a LAN, in accordance with some embodiments of this disclosure. FIG. 10 shows generalized embodiments of illustrative computing devices 1000 and 1001, which may correspond to, e.g., a smart phone; a tablet; a laptop computer; a personal computer; a desktop computer; a smart television; a smart watch or wearable device; smart glasses; a stereoscopic display; a wearable camera; virtual reality (VR) glasses; VR goggles; a stereoscopic display; augmented reality (AR) glasses; an AR HMD; a VR HMD; or any other suitable computing device; or any combination thereof. In another example, computing device 1001 may be a user television equipment system or device. In some embodiments, computing devices 1000 and 1001 may correspond to, e.g., device 112 or device 114 of FIG. 1.

User television equipment device 1001 may include set-top box 1015. Set-top box 1015 may be communicatively connected to microphone 1016, Audio output equipment (e.g., speaker or headphones 1014), and display 1012. In some embodiments, microphone 1016 may receive audio corresponding to a voice of a user providing input. In some embodiments, display 1012 may be a television display or a computer display. In some embodiments, set-top box 1015 may be communicatively connected to user input interface 1010. In some embodiments, user input interface 1010 may be a remote control device. Set-top box 1015 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of computing devices are discussed below in connection with FIG. 11. In some embodiments, computing device 1000 may comprise any suitable number of sensors (e.g., gyroscope or accelerometer, etc.), and/or a GPS module (e.g., in communication with one or more servers and/or cell towers and/or satellites) to ascertain a location of computing device 1000. In some embodiments, computing device 1000 comprises a rechargeable battery that is configured to provide power to the components of the device.

Each one of computing device 1000 and computing device 1001 may receive content and data via input/output (I/O) path 1002. I/O path 1002 may provide content (e.g., broadcast programming, on-demand programming, Internet content, content available over a local area network (LAN) or wide area network (WAN), and/or other content) and data to control circuitry 1004, which may comprise processing circuitry 1006 and storage 1008. Control circuitry 1004 may be used to send and receive commands, requests, and other suitable data using I/O path 1002, which may comprise I/O circuitry. I/O path 1002 may connect control circuitry 1004 (and specifically processing circuitry 1006) to one or more communications paths (described below). I/O functions may be provided by one or more of these communications paths, but are shown as a single path in FIG. 10 to avoid over-complicating the drawing. While set-top box 1015 is shown in FIG. 3 for illustration, any suitable computing device having processing circuitry, control circuitry, and storage may be used in accordance with the present disclosure. For example, set-top box 1015 may be replaced by, or complemented by, a personal computer (e.g., a notebook, a laptop, a desktop), a smartphone (e.g., computing device 1000), an XR device; a tablet; a network-based server hosting a user-accessible client device; a non-user-owned device; any other suitable device; or any combination thereof.

Control circuitry 1004 may be based on any suitable control circuitry such as processing circuitry 1006. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1004 executes instructions for the system or application stored in memory (e.g., storage 1008). Specifically, control circuitry 1004 may be instructed by the system or application to perform the functions discussed above and below. In some implementations, processing or actions performed by control circuitry 1004 may be based on instructions received from the system or application.

In client/server-based embodiments, control circuitry 1004 may include communications circuitry suitable for communicating with a server or other networks or servers. The system or application may be a stand-alone application implemented on a device or a server. The system or application may be implemented as software or a set of executable instructions. The instructions for performing any of the embodiments discussed herein of the system or application may be encoded on non-transitory computer-readable media (e.g., a hard drive, random-access memory on a DRAM integrated circuit, read-only memory on a BLU-RAY disk, etc.). For example, the instructions may be stored in storage 1008, and executed by control circuitry 1004 of a computing device 1000.

In some embodiments, the system or application may be a client/server application where only the client application resides on device 1000 (e.g., device 112 or 114), and a server application resides on an external server (e.g., server 1104). For example, the system or application may be implemented partially as a client application on control circuitry 1004 of device 1000 and partially on server 1104 as a server application running on control circuitry 1111. Server 1104 may be a part of a local area network with one or more of computing devices 1000, 1001 or may be part of a cloud computing environment accessed via the Internet. In a cloud computing environment, various types of computing services for performing searches on the Internet or informational databases, providing video communication capabilities, providing storage (e.g., for a database) or parsing data are provided by a collection of network-accessible computing and storage resources (e.g., server 1104 and/or an edge computing device), referred to as “the cloud.” Device 1000 may be a cloud client that relies on the cloud computing capabilities from server 1104 to determine whether processing (e.g., at least a portion of virtual background processing and/or at least a portion of other processing tasks) should be offloaded from the mobile device, and facilitate such offloading. When executed by control circuitry of server 1104, the system or application may instruct control circuitry 1111 to perform processing tasks for the client device and facilitate applying preferential treatment on the WAN to certain network traffic corresponding to data requested by a device on a LAN. The client application may instruct control circuitry 1004 to determine whether processing should be offloaded. In some embodiments, data structures 700, 702, and 704 of FIGS. 7A-7C may be located at server 1104 and/or database 1105 and/or at computing device 1107, 1108 and/or 1110 and/or LAN networking equipment 1115 and/or WAN networking equipment 1117.

Control circuitry 1004 may include communications circuitry suitable for communicating with a server, edge computing systems and devices, a table or database server, or other networks or servers The instructions for carrying out the above mentioned functionality may be stored on a server (which is described in more detail in connection with FIG. 11. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 11). In addition, communications circuitry may include circuitry that enables peer-to-peer communication of computing devices, or communication of computing devices in locations remote from each other (described in more detail below).

Memory may be an electronic storage device provided as storage 1008 that is part of control circuitry 1004. As referred to herein, the phrase “electronic storage device” or “storage device” should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1008 may be used to store various types of content described herein as well as the system or application data described above. Nonvolatile memory may also be used (e.g., to launch a boot-up routine and other instructions).

Cloud-based storage, described in more detail in relation to FIG. 11, may be used to supplement storage 1008 or instead of storage 1008.

Control circuitry 1004 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 1004 may also include scaler circuitry for upconverting and downconverting content into the preferred output format of computing device 1000. Control circuitry 1004 may also include digital-to-analog converter circuitry and analog-to-digital converter circuitry for converting between digital and analog signals. The tuning and encoding circuitry may be used by computing device 1000, 1001 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1008 is provided as a separate device from computing device 1000, the tuning and encoding circuitry (including multiple tuners) may be associated with storage 1008.

Control circuitry 1004 may receive instruction from a user by way of user input interface 1010. User input interface 1010 may be any suitable user interface, such as a remote control, mouse, trackball, keypad, keyboard, touchscreen, touchpad, stylus input, joystick, voice recognition interface, or other user input interfaces. Display 812 may be provided as a stand-alone device or integrated with other elements of each one of computing device 1000 and computing device 1001. For example, display 1012 may be a touchscreen or touch-sensitive display. In such circumstances, user input interface 1010 may be integrated with or combined with display 1012. In some embodiments, user input interface 1010 includes a remote-control device having one or more microphones, buttons, keypads, any other components configured to receive user input or combinations thereof. For example, user input interface 1010 may include a handheld remote-control device having an alphanumeric keypad and option buttons. In a further example, user input interface 1010 may include a handheld remote-control device having a microphone and control circuitry configured to receive and identify voice commands and transmit information to set-top box 1015.

Audio output equipment 814 may be integrated with or combined with display 812. Display 812 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 812. Audio output equipment 1014 may be provided as integrated with other elements of each one of computing device 1000 and computing device 1001 or may be stand-alone units. An audio component of videos and other content displayed on display 812 may be played through speakers (or headphones) of audio output equipment 814. In some embodiments, audio may be distributed to a receiver (not shown), which processes and outputs the audio via speakers of audio output equipment 814. In some embodiments, for example, control circuitry 1004 is configured to provide audio cues to a user, or other audio feedback to a user, using speakers of audio output equipment 814. There may be a separate microphone 816 or audio output equipment 814 may include a microphone configured to receive audio input such as voice commands or speech. For example, a user may speak letters or words or terms or numbers that are received by the microphone and converted to text by control circuitry 1004. In a further example, a user may voice commands that are received by a microphone and recognized by control circuitry 1004. Camera 1018 may be any suitable video camera integrated with the equipment or externally connected. Camera 1018 may be a digital camera comprising a charge-coupled device (CCD) and/or a complementary metal-oxide semiconductor (CMOS) image sensor. Camera 1018 may be an analog camera that converts to digital images via a video card.

The system or application may be implemented using any suitable architecture. For example, it may be a stand-alone application wholly-implemented on each one of computing device 1000 and computing device 1001. In such an approach, instructions of the application may be stored locally (e.g., in storage 1008), and data for use by the application is downloaded on a periodic basis (e.g., from an out-of-band feed, from an Internet resource, or using another suitable approach). Control circuitry 1004 may retrieve instructions of the application from storage 1008 and process the instructions to provide the functionality, and generate any of the displays, discussed herein. Based on the processed instructions, control circuitry 1004 may determine what action to perform when input is received from user input interface 1010. For example, movement of a cursor on a display up/down may be indicated by the processed instructions when user input interface 1010 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 1004 may allow a user to provide user profile information or may automatically compile user profile information. For example, control circuitry 1004 may access and monitor network data, video data, audio data, processing data, historical interactions by the user, and/or any other suitable data. Control circuitry 1004 may obtain all or part of other user profiles that are related to a particular user (e.g., via social media networks), and/or obtain information about the user from other sources that control circuitry 1004 may access. As a result, a user can be provided with a unified experience across the user's different devices.

In some embodiments, the system or application is a client/server-based application. Data for use by a thick or thin client implemented on each one of computing device 1000 and computing device 1001 may be retrieved on-demand by issuing requests to a server remote to each one of computing device 1000 and computing device 1001. For example, the remote server may store the instructions for the application in a storage device. The remote server may process the stored instructions using circuitry (e.g., control circuitry 1004) and generate the displays discussed above and below. The client device may receive the displays generated by the remote server and may display the content of the displays locally on computing device 1000. This way, the processing of the instructions is performed remotely by the server while the resulting displays (e.g., that may include text, a keyboard, or other visuals) are provided locally on computing device 1000. Computing device 1000 may receive inputs from the user via input interface 310 and transmit those inputs to the remote server for processing and generating the corresponding displays. For example, computing device 1000 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to computing device 1000 for presentation to the user.

In some embodiments, the system or application may be downloaded and interpreted or otherwise run by an interpreter or virtual machine (run by control circuitry 1004). In some embodiments, system or application may be encoded in the ETV Binary Interchange Format (EBIF), received by control circuitry 1004 as part of a suitable feed, and interpreted by a user agent running on control circuitry 1004. For example, the system or application may be an EBIF application. In some embodiments, the system or application may be defined by a series of JAVA-based files that are received and run by a local virtual machine or other suitable middleware executed by control circuitry 1004. In some of such embodiments (e.g., those employing MPEG-2, MPEG-4, HEVC or any other suitable digital media encoding schemes), the system or application may be, for example, encoded and transmitted in an MPEG-2 object carousel with the MPEG audio and video packets of a program.

FIG. 11 is a diagram of an illustrative system 1100 for providing recommendations for enforcing a data cap for preferential network traffic, in accordance with some embodiments of this disclosure. Computing devices 1107, 1108, 1110 (which may correspond to, e.g., computing device 1000 or 1001) may be coupled to communication network 1109. Communication network 1109 may be one or more networks including the Internet, a mobile phone network, mobile voice or data network (e.g., a 5G, 4G, or LTE network), cable network, public switched telephone network, satellite network, or other types of communication network or combinations of communication networks. Paths (e.g., depicted as arrows connecting the respective devices to the communication network 1109) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 11 to avoid overcomplicating the drawing. In some embodiments, communication network 1109 may correspond to service provider network 102.

LAN networking equipment 1115 may correspond to, for example, networking equipment 106 and/or 108 (e.g., router, gateway, switch, and/or modem and/or other suitable equipment) of FIG. 1. LAN networking equipment 1115 may comprise control circuitry 1121, I/O path 1122, and storage 1124. WAN networking equipment 1117 may correspond to, for example, networking equipment 122 (e.g., a backbone or carrier router or CMTS other suitable networking equipment) of FIG. 1. WAN networking equipment 1117 may comprise control circuitry 11131, I/O path 1132, and storage 1134.

Although communications paths are not drawn between computing devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The computing devices may also communicate with each other directly through an indirect path via communication network 1109.

System 1100 may comprise media content source 1102, one or more servers 1104, and/or one or more edge computing devices. In some embodiments, system or application may be executed at one or more of control circuitry 1111 of server 1104 (and/or control circuitry of computing devices 1107, 1108, 1110 and/or control circuitry of one or more edge computing devices). In some embodiments, media content source 1102 and/or server 1104 may be configured to facilitate network traffic between computing devices 1107, 1108, 1110 and/or any other suitable computing devices, and/or host or otherwise be in communication (e.g., over network 1109) with one or more application services. In some embodiments, server 1104 may perform actions to facilitate processing network traffic based on received user input as described herein.

In some embodiments, server 1104 may include control circuitry 1111 and storage 1114 (e.g., RAM, ROM, Hard Disk, Removable Disk, etc.). Storage 1114 may store one or more databases. Server 1104 may also include an input/output path 1112. I/O path 1112 may provide network traffic information, user preferences, device information, or other data, over a LAN or WAN, and/or other content and data to control circuitry 1111, which may include processing circuitry, and storage 1114. Control circuitry 1111 may be used to send and receive commands, requests, and other suitable data using I/O path 1112, which may comprise I/O circuitry. I/O path 1112 may connect control circuitry 1111 (and specifically control circuitry) to one or more communications paths.

Control circuitry 1111 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1111 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1111 executes instructions for an emulation system application stored in memory (e.g., the storage 1114). Memory may be an electronic storage device provided as storage 1114 that is part of control circuitry 1111.

Figure 12:
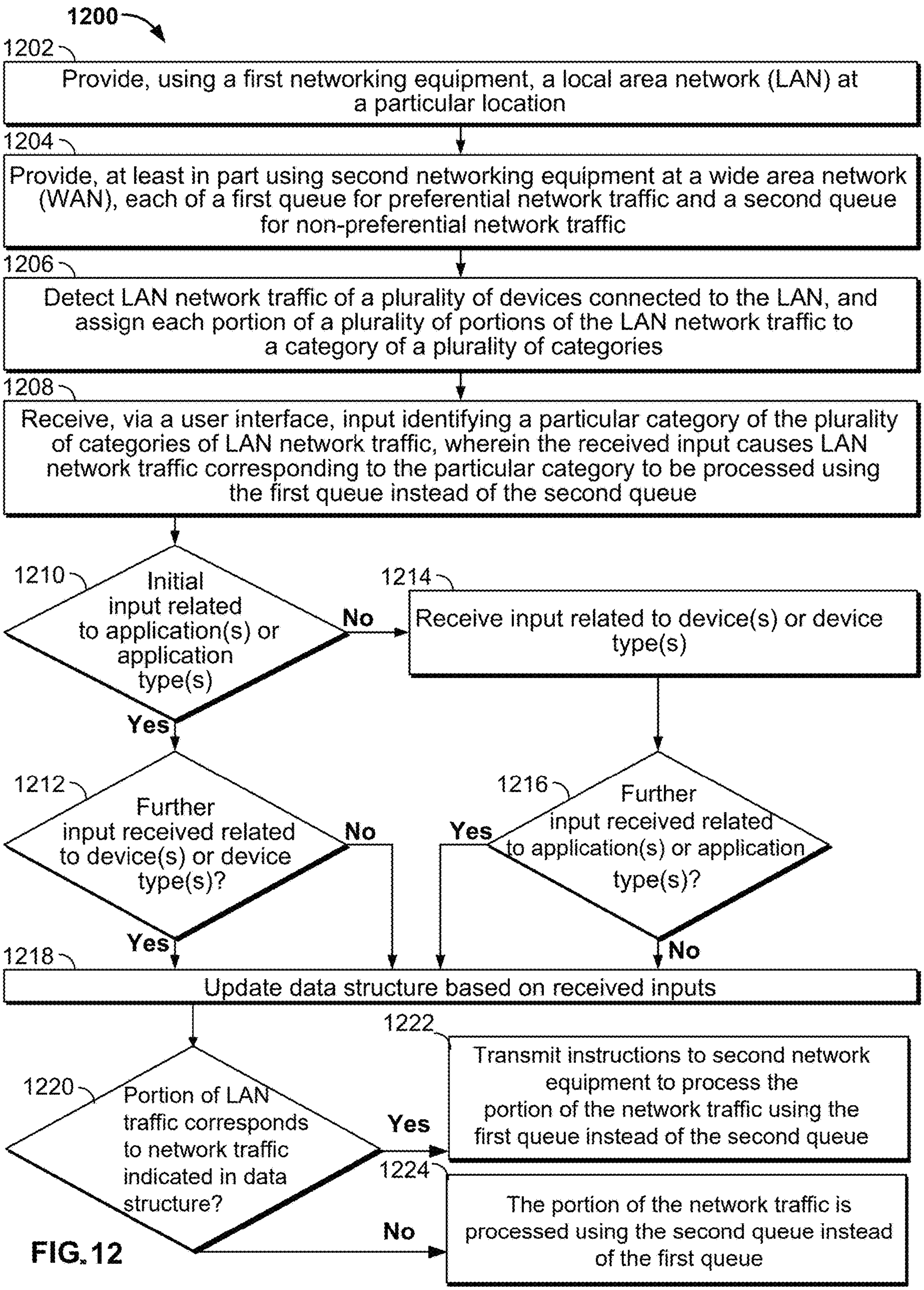
FIG. 12 is a flowchart of a detailed illustrative process for preferential treatment of network traffic on a WAN based on received input, in accordance with some embodiments of this disclosure.

FIG. 12 is a flowchart of a detailed illustrative process 1200 for preferential treatment of network traffic on a WAN based on received input, in accordance with some embodiments of this disclosure. In various embodiments, the individual steps of process 1200 may be implemented by one or more components of the devices, methods, and systems of FIGS. 1-11 and may be performed in combination with any of the other processes and aspects described herein. Although the present disclosure may describe certain steps of process 1200 (and of other processes described herein) as being implemented by certain components of the devices, methods, and systems of FIGS. 1-11, this is for purposes of illustration only, and it should be understood that other components of the devices, methods, and systems of FIGS. 1-11 may implement those steps instead.

At 1202, control circuitry (e.g., control circuitry 1121 of FIG. 11 of LAN networking equipment 1115 and/or control circuitry 1131 of WAN networking equipment 1117 of FIG. 11) and/or I/O circuitry (e.g., 1121 of FIGS. 11 and/or 1132 of FIG. 11 of LAN networking equipment 1115 and WAN networking equipment 1117, respectively, of FIG. 11) and/or a network interface, may provide a LAN (e.g., a Wi-Fi network) at a particular location (e.g., location 104, which may be a home or residence of user 110 or any other suitable type of location). For example, router, modem, and/or gateway 106 and/or 108 may be used to provide such LAN, to enable devices 112 and 114 to connect to the Internet and access any suitable application or service (e.g., a video conference call via Zoom 118 or a "Call of Duty" video game online mode 116).

At 1204, the control circuitry (and/or the I/O circuitry and/or the network interface) may provide, at a WAN (e.g., provided by service provider network 102 of FIG. 1) at least in part on using second networking equipment (e.g., networking equipment 122 of FIG. 1), each of a first queue for preferential (e.g., LAS-capable) network traffic (e.g., via service flow 206, 210, and/or 218 of FIGS. 2A-2B) and a second queue for non-preferential (e.g., non-L4S) network traffic (e.g., via service flow 208, 212, and/or 220 of FIGS. 2A-2B).

At 1206, the control circuitry may detect network traffic of a plurality of devices (e.g., devices 112 and 114) connected to the LAN, and assign each portion of a plurality of portions of the network traffic to a category of a plurality of categories of network traffic. For example, the control circuitry may categorize the online video game 116 as "gaming" network traffic (as shown in FIG. 5A), and video conferencing application 118 as "video calls/conferences" network traffic (as shown in FIG. 5A). In some embodiments, the category may correspond to a particular device on the LAN for which the network traffic is destined or from which the network traffic was transmitted, and/or a particular device type, a particular application type, or a particular application, and/or any other suitable category. The control circuitry may determine categories for the network traffic by analyzing header information, IP address information, source information, destination information and/or codepoint information of the network traffic, or may employ any other suitable technique. In some embodiments, data structure 704 of FIG. 7C may be updated based on current traffic associated with the LAN. For example, data structure 704 of FIG. 7C may be stored at storage 1124 of LAN networking equipment 1115, storage 1134 of WAN networking equipment 1117, database 1105 and/or storage 1114 of server 1104. In some embodiments, cloud server 124 may generate the network traffic provided to the LAN of location 104.

At 1208, the control circuitry and/or I/O circuitry may receive, via a user interface, input identifying a particular category of the plurality of network traffic categories detected at 1206. For example, the I/O circuitry may receive input (e.g., touch input, a mouse click, voice input, biometric input, or any other suitable input or any combination thereof) identifying a particular category. Such input may be used, at 1218, to update one or more data structures (e.g., stored at modem 106 and/or router 108 or other LAN networking equipment, or at a remote server), and may trigger the control circuitry (e.g., executing traffic analysis module 121) to transmit instructions to TIPE module 123 upon detecting network traffic requested by a LAN device that corresponds to the received input, where the instructions may comprise an indication of a rule and/or policy as to how the network traffic is to be processed (e.g., delivered at least in part using the low-latency queue of the WAN).

As shown at 1210, the control circuitry and/or I/O circuitry may determine whether the input relates to one or more applications (e.g., "Call of Duty" or "Zoom") or one or more application types ("video conferencing" or "video games" as shown at FIG. 5A) and/or any other suitable qualifiers (e.g., "Zoom" but only at certain times of day, or all video conferencing except for Facetime, or only action video games, or only sports video games, or any other suitable qualifier, or any combination thereof). An affirmative determination at 1210 may cause processing to proceed to 1212; otherwise processing may proceed to 1214.

At 1212, the control circuitry and/or I/O circuitry may determine whether further input related to one or more devices, one or more device types, and/or one or more qualifiers is received. For example, user interface 504 and/or 506 may be displayed to allow a user to drill down in their selections of certain devices for which preferential network traffic should be provided within the "gaming" category, or within the "cloud camera recording" category.

At 1214, the control circuitry and/or I/O circuitry may determine that input is received related to one or more device or device types (e.g., DJ-Laptop 612 as shown at FIG. 6A) and/or any other suitable qualifiers (e.g., all iPhones except for my son Mike's iPhone), and processing may proceed to 1216.

At 1216, the control circuitry and/or I/O circuitry may determine whether further input related to one or more devices, one or more device types and/or one or more qualifiers is received. For example, user interface 604 and/or 606 may be displayed to allow a user to drill down in their selections of certain devices for which preferential network traffic should be provided within the "gaming" category, or within the "cloud camera recording" category.

In some embodiments, the user interfaces provided in relation to steps 1210-1216 may be populated based on the devices detected in the LAN and/or based on an amount of detected network traffic and/or based on a determination of which devices might benefit most from latency priority. In some embodiments, only devices that are LAS-capable may be displayed on user interfaces of FIGS. 5A-5D and 6A-6D. In some embodiments, application-device preferential flow pairs may be specified via nested user interfaces. In some embodiments, a user may provide natural language input (e.g., via a voice command or text input) of desired preferences, e.g., "Please treat all episodes of 'Game of Thrones' as preferential."

At 1218, the control circuitry may use the input received at steps 1210-1216 to create or update data structures of user preferential network traffic (e.g., data structures 700 and 702 of FIGS. 7A-7B). For example, data structures 700 and 702 may be stored at storage 1124 of LAN networking equipment 1115, storage 1134 of WAN networking equipment 1117, database 1105, and/or server 1104. In some embodiments, the data in the data structures may be stored as, and/or translated to, application (or application type)-device (or device type) pairs, and/or device (or device type)-application (or application type) pairs, any other suitable type of pairs, or any suitable combination thereof.

At 1220, the control circuitry and/or I/O circuitry may monitor network traffic on the LAN (e.g., at location 104 of FIG. 1) to determine whether the LAN network traffic corresponds to network traffic indicated in the data structure updated at 1218. For example, when the control circuitry detects a new network traffic flow (e.g., indicated in data structure 704 of FIG. 7C) on the LAN, the control circuitry analyzes the network traffic flow to determine whether it matches a {device, application flow} pair, or other suitable pair, stored in or otherwise obtained from the data structure (e.g., 700 or 702 of FIGS. 7A-7B). For example, the control circuitry (e.g., executing module 121 of FIG. 1) may determine that the current network traffic associated with a request from an LAN device (i) corresponds to the particular category (or categories) selected at steps 1210-1216, and (ii) is intended for (e.g., has a destination matching) the first networking equipment (e.g., first networking equipment 106 and/or 108 of FIG. 1) or is transmitted by the first networking equipment.

At 1222, upon determining that the current portion of network traffic (e.g., received subsequent to the network traffic used to generate the categories of network traffic for the LAN at 1206) corresponds to network traffic indicated in the data structure and/or corresponding to {device, application flow} pair, or other suitable pair specified by the user input, the control circuitry may map the network traffic flow requested by a device (e.g., device 112 or 114 of FIG. 1) on the LAN (e.g., at location 104 of FIG. 1) to a 5-tuple, {IP address (source, destination), protocol, port (source, destination)}, for use by WAN networking equipment. For example, the control circuitry (e.g., LAN networking equipment 1115 of FIG. 11) may transmit, based on an affirmative determination at 1220, instructions to second networking equipment (e.g., WAN networking equipment 1117 of FIG. 11) to cause the second networking equipment to process the portion of the network traffic identified at 1220 using the first queue (e.g., a low latency queue, such as, for example, low latency LAS-capable queue as part of service flow 206, 210 of FIG. 2A). Such instructions transmitted to the WAN networking equipment may include, for example, a rule or policy for the identified portion of network traffic (e.g., as indicated in the data structure for such type of network traffic) to be dynamically enforced by, e.g., TIPE module 123 of FIG. 1. In some embodiments, the instructions may include identifying information of the network flow, e.g., the 5-tuple data. In some embodiments, the data structures may be maintained on devices associated with the LAN for specific subscribers, rather than being shared with the WAN networking equipment.

In some embodiments, only categories of traffic specified by the user via user input (e.g., at user interfaces of FIGS. 5A-5D and 6A-6D) may be processed using such first queue. For example, network traffic requested by the first networking equipment that is not L4S-capable and/or that is not selected by the user may be processed using the second queue (e.g., the second service flow 208, 212 of FIG. 2B). In some embodiments, the IP header of a data packet in such subsequent network traffic may indicate that such traffic category was specified by the user for preferential treatment.

At 1224, if the current portion of network traffic on the LAN does not match one or more particular categories of network traffic specific by the inputs received at 1210-1216 and/or stored in the data structures, the portion of the network traffic may be processed (e.g., by the WAN networking equipment) using the second queue (e.g., the classic queue) for non-preferential network traffic. For example, the LAN networking equipment may not transmit any instructions to the WAN networking equipment, as the WAN networking equipment may be configured to, by default (e.g., in the absence of any instructions from the LAN networking equipment), provide the portion of the network traffic using the second queue.

In some embodiments, the process of FIG. 12 may be performed simultaneously or in parallel for multiple types of network traffic requested by devices on the LAN. For example, the second networking equipment on the WAN may, in parallel or serially, receive instructions regarding various detected LAN network traffic determined by the first networking equipment to match a category indicated by the user preferences as desired to be treated preferentially. In some embodiments, a particular application or network flow may be specified by the user to be treated preferentially regardless of the device on the LAN being used to access such application or network flow. In some embodiments, a particular device or particular user profile determined to be requesting access to an application or service may be specified by user input not to be treated preferentially, e.g., to be processed in the classic queue. In some embodiments, device(s) or application(s) may be marked with a "don't care" status, e.g., can be used in the L4S-capable queue provided such device and/or application is L4S-capable and provided such traffic would not interfere with other preferentially indicated devices or applications.

In some embodiments, as part of the process of FIG. 12, the control circuitry may determine whether a particular network traffic data cap has been reached, e.g., per application or per device. For example, the LAN at location 104 may be associated with a data cap for network traffic categorized for gaming, either as specified by user 110 or as specified by service provider network 102 of FIG. 1.

In some embodiments, as part of the process of FIG. 12, the control circuitry may recommend that a user provide input to specify that network traffic for a particular device and/or application be given preferential treatment, based on detecting that such device and/or application is being currently accessed or requested to be accessed. For example, in response to a user launching an application on an Xbox, the control circuitry may recommend that a user provide input to cause (or may automatically cause) network traffic transmitted for or to the Xbox (or for a particular game played on the Xbox, such as "Call of Duty" 116), be treated preferentially.

The process of FIG. 12 provides customized broadband based on a customer's application (network traffic) needs. The system may request information from a customer (that it is expected that they can reasonably provide), and then use that information to configure their gateway (e.g., cable modem and router combination) to provide them with a customized broadband service. Users can choose which applications on which devices matter most to them such that the network treats these application flows specially, and/or users can rank-order {device, application flow} pairs such that the network considers the relative importance of all the prioritized application flows in packet scheduling. The customer may be provided with an improved experience, which manifests as a higher responsiveness and greater reliability for the chosen applications on the selected devices.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

providing, using a first networking equipment, a local area network (LAN) at a particular location, wherein the LAN is connected to a wide area network (WAN) associated with a second networking equipment, and wherein each of a first queue for preferential network traffic and a second queue for non-preferential network traffic is provided at least in part by the second networking equipment;

detecting network traffic of a plurality of devices connected to the LAN, and assigning each portion of a plurality of portions of the network traffic to a category of a plurality of categories;

receiving, via a user interface, input identifying a particular category of the plurality of categories of network traffic, wherein the received input causes network traffic corresponding to the particular category to be processed using the first queue instead of the second queue;

based on the received input, updating a stored data structure comprising a ranking of the plurality of categories, wherein the second networking equipment is configured to process at least a portion of subsequent network traffic using the first queue or the second queue based at least in part on the ranking stored in the data structure, based at least in part on the first networking equipment detecting that at least a portion of the plurality of categories are currently active in the subsequent network traffic; and based at least in part on detecting, at the first networking equipment, that a portion of subsequent network traffic associated with a request by a device of the plurality of devices connected to the LAN corresponds to the particular category, transmitting instructions to the second networking equipment to process the portion of subsequent network traffic using the first queue instead of the second queue.

2. The method of claim 1, wherein the first queue for the preferential network traffic is for low latency, low loss, and scalable throughput (L4S) network traffic, and the second queue for the non-preferential network traffic is for non-L4S network traffic.

3. The method of claim 1, wherein the instructions comprise a policy or a rule related to processing the portion of network traffic using the first queue, and the method further comprising:

detecting, using the first networking equipment, that a network flow of the subsequent portion of network traffic corresponding to the particular category has ended; and transmitting instructions to the second networking equipment to cause the second networking equipment to remove the policy or rule having been associated with the previously active particular network flow processed using the first queue.

4. The method of claim 1, further comprising:

based on receiving the input, updating a data field of a data structure to indicate that the particular category of the network traffic is to be processed using the first queue; and wherein the second networking equipment is configured to cause the portion of the subsequent network traffic corresponding to the particular category to be processed using the first queue by marking data associated with the portion of the subsequent network traffic with a codepoint.

5. The method of claim 4, wherein:

the particular category is a first category, and the plurality of categories of network traffic comprise the first category and a second category;

the user interface provides an option for the first category and the second category, and the received input identifies the first category and does not identify the second category; and the method further comprises causing the data structure to indicate that the second category was not identified in the received input, wherein the instructions transmitted to the second networking equipment causes the second networking equipment to process a portion of subsequent network traffic, requested by a device of the plurality of devices connected to the LAN and corresponding to the second category, using the second queue.

6. The method of claim 1, wherein:

at least a first subset of the plurality of categories is associated with a respective type of Internet application of a plurality of types of Internet applications; and the user interface comprises a plurality of options respectively associated with the plurality of types of Internet applications, and the particular category comprises a particular type of Internet application.

7. The method of claim 6, wherein:

at least a second subset of the plurality of categories is associated with a respective type of device of the plurality of devices;

the method further comprises receiving input indicating one or more devices of the plurality of devices; and the received input of the one or more devices causes the second networking equipment to process the portion of the subsequent network traffic, for the particular type of Internet application and that is requested by the one or more devices, using the first queue.

8. The method of claim 1, wherein:

at least a first subset of the plurality of categories is associated with a respective device of the plurality of devices; and the user interface comprises a plurality of options respectively associated with the plurality of devices, and the particular category comprises a particular device.

9. The method of claim 8, wherein:

at least a second subset of the plurality of categories is associated with a respective type of Internet application of a plurality of types of Internet applications;

the method further comprises receiving input indicating one or more types of Internet applications; and the received input of the one or more types of Internet applications causes the second networking equipment to process the portion of the subsequent network traffic, for the one or more types of Internet applications and that is requested by the particular device, using the first queue.

10. A method comprising:

providing, using a first networking equipment, a local area network (LAN) at a particular location, wherein the LAN is connected to a wide area network (WAN) associated with a second networking equipment, and wherein each of a first queue for preferential network traffic and a second queue for non-preferential network traffic is provided at least in part by the second networking equipment;

detecting network traffic of a plurality of devices connected to the LAN, and assigning each portion of a plurality of portions of the network traffic to a category of a plurality of categories;

receiving, via a user interface, input identifying a particular category of the plurality of categories of network traffic, wherein the received input causes network traffic corresponding to the particular category to be processed using the first queue instead of the second queue;

based at least in part on detecting, at the first networking equipment, that a portion of subsequent network traffic associated with a request by a device of the plurality of devices connected to the LAN corresponds to the particular category, transmitting instructions to the second networking equipment to process the portion of subsequent network traffic using the first queue instead of the second queue;

determining a data cap for the particular category of the plurality of categories of the network traffic; and performing a particular action in relation to the portion of the subsequent network traffic based at least in part on determining that the data cap has been reached.

11. The method of claim 1, wherein detecting the network traffic of the plurality of devices comprises analyzing historical patterns of the network traffic over a period of time, and at least one option, for which the input is received, is provided via the user interface based on the analyzed historical patterns.

12. The method of claim 1, wherein at least one option, for which the input is received, is associated with whether the first queue or the second queue is to be used by the second networking equipment to process network traffic corresponding to the particular category at a particular time of day.

13. A system comprising:

a first networking equipment;

control circuitry configured to:

provide, using the first networking equipment, a local area network (LAN) at a particular location, wherein the LAN is connected to a wide area network (WAN) associated with a second networking equipment, and wherein each of a first queue for preferential network traffic and a second queue for non-preferential network traffic is provided at least in part by the second networking equipment;

detect network traffic of a plurality of devices connected to the LAN, and assigning each portion of a plurality of portions of the network traffic to a category of a plurality of categories;

receive, via a user interface, input identifying a particular category of the plurality of categories of network traffic, wherein the received input causes network traffic corresponding to the particular category to be processed using the first queue instead of the second queue;

based on the received input, update a stored data structure comprising a ranking of the plurality of categories, wherein the second networking equipment is configured to process at least a portion of subsequent network traffic using the first queue or the second queue based at least in part on the ranking stored in the data structure, based at least in part on the first networking equipment detecting that at least a portion of the plurality of categories are currently active in the subsequent network traffic; and based at least in part on detecting, at the first networking equipment, that a portion of subsequent network traffic associated with a request by a device of the plurality of devices connected to the LAN corresponds to the particular category, transmit instructions to the second networking equipment to process the portion of subsequent network traffic using the first queue instead of the second queue.

14. The system of claim 13, wherein the first queue for the preferential network traffic is for low latency, low loss, and scalable throughput (L4S) network traffic, and the second queue for the non-preferential network traffic is for non-L4S network traffic.

15. The system of claim 13, wherein the instructions comprise a policy or a rule related to processing the portion of network traffic using the first queue, and the control circuitry is further configured to:

detect, using the first networking equipment, that a network flow of the subsequent portion of network traffic corresponding to the particular category has ended; and transmit instructions to the second networking equipment to cause the second networking equipment to remove the policy or rule having been associated with the previously active particular network flow processed using the first queue.

16. The system of claim 13, wherein the control circuitry is further configured to:

based on receiving the input, updating a data field of a data structure to indicate that the particular category of the network traffic is to be processed using the first queue; and wherein the second networking equipment is configured to cause the portion of the subsequent network traffic corresponding to the particular category to be processed using the first queue by marking data associated with the portion of the subsequent network traffic with a codepoint.

17. The system of claim 16, wherein:

the particular category is a first category, and the plurality of categories of network traffic comprise the first category and a second category;

the user interface provides an option for the first category and the second category, and the received input identifies the first category and does not identify the second category; and the control circuitry is further configured to cause the data structure to indicate that the second category was not identified in the received input, wherein the instructions transmitted to the second networking equipment causes the second networking equipment to process a portion of subsequent network traffic, requested by a device of the plurality of devices connected to the LAN and corresponding to the second category, using the second queue.

18. The system of claim 13, wherein:

at least a first subset of the plurality of categories is associated with a respective type of Internet application of a plurality of types of Internet applications; and the user interface comprises a plurality of options respectively associated with the plurality of types of Internet applications, and the particular category comprises a particular type of Internet application.

19. The system of claim 18, wherein:

at least a second subset of the plurality of categories is associated with a respective type of device of the plurality of devices;

the control circuitry is further configured to receive input indicating one or more devices of the plurality of devices; and the received input of the one or more devices causes the second networking equipment to process the portion of the subsequent network traffic, for the particular type of Internet application and that is requested by the one or more devices, using the first queue.

* * * * *